(12) United States Patent
Wagner et al.

(10) Patent No.: US 10,730,006 B2
(45) Date of Patent: Aug. 4, 2020

(54) PORT SEPARATION FOR ROTARY BED PSA

(71) Applicant: Air Products and Chemicals, Inc., Allentown, PA (US)

(72) Inventors: Glenn Paul Wagner, Fogelsville, PA (US); Xue Mei Liu, Vancouver (CA); Jinzhong Liu, Richmond (CA); Roger Dean Whitley, Allentown, PA (US); Shubhra Jyoti Bhadra, Macungie, PA (US); Michael Jamie McKerrow, Surrey (CA)

(73) Assignee: Air Products and Chemicals, Inc., Allentown, PA (US)

( * ) Notice: Subject to any disclaimer, the term of this patent is extended or adjusted under 35 U.S.C. 154(b) by 127 days.

(21) Appl. No.: 16/102,936

(22) Filed: Aug. 14, 2018

(65) Prior Publication Data
US 2020/0054988 A1    Feb. 20, 2020

(51) Int. Cl.
*B01D 53/047*     (2006.01)
*B01D 53/06*      (2006.01)

(52) U.S. Cl.
CPC .......... *B01D 53/06* (2013.01); *B01D 53/047* (2013.01); *B01D 2257/104* (2013.01); *B01D 2259/402* (2013.01); *B01D 2259/40005* (2013.01); *B01D 2259/40015* (2013.01); *B01D 2259/4066* (2013.01)

(58) Field of Classification Search
CPC ...... B01D 53/04; B01D 53/06; B01D 53/047; B01D 53/0446; B01D 2257/104; B01D 2257/2259; B01D 2257/40005; B01D 2257/40015; B01D 2257/40043; B01D 2257/402; B01D 2257/4066

USPC ............................... 95/96, 113; 96/126, 150
See application file for complete search history.

(56) References Cited

U.S. PATENT DOCUMENTS

| 2,771,964 | A | * | 11/1956 | Miller ................ C01B 17/0408 |
| | | | | 95/113 |
| 3,801,513 | A | | 4/1974 | Munzner et al. |
| 4,458,022 | A | | 7/1984 | Ohsaki et al. |
| 4,548,799 | A | | 10/1985 | Knoblauch et al. |

(Continued)

FOREIGN PATENT DOCUMENTS

| CA | 2374536 A1 | 12/2000 |
| CN | 202337689 U | 7/2012 |

(Continued)

OTHER PUBLICATIONS

Babicki, M., et al.; "PSA Technology Hits the Fast Lane"; Chemical Processing; PutmanMedia; Aug. 2003; pp. 1-6.

(Continued)

*Primary Examiner* — Frank M Lawrence, Jr.
(74) *Attorney, Agent, or Firm* — Matthew R. Weaver

(57) ABSTRACT

Disclosed herein is a stator plate for a rotary bed PSA apparatus that has an exhaust slot that has first and second sections for receiving blowdown and purge exhaust gas streams, the sections being separated by a flow restriction that restricts but does not full prevent gas flow between the sections, or that has separate exhaust slots for separately receiving the blowdown and purge exhaust gas streams. Also disclosed is pressure swing adsorption (PSA) apparatus including such a stator plate, and a rotary bed PSA process using such an apparatus.

27 Claims, 14 Drawing Sheets

(56) References Cited

U.S. PATENT DOCUMENTS

| | | | |
|---|---|---|---|
| 4,742,040 A | | 5/1988 | Ohsaki et al. |
| 4,764,276 A | * | 8/1988 | Berry ............... B01D 53/06 210/264 |
| 4,938,939 A | | 7/1990 | Kuznicki |
| 5,098,880 A | | 3/1992 | Gaffney et al. |
| 5,164,355 A | | 11/1992 | Farris et al. |
| 5,827,358 A | * | 10/1998 | Kulish ............... B01D 53/0407 96/115 |
| 5,972,834 A | | 10/1999 | Ohsaki et al. |
| 6,051,050 A | | 4/2000 | Keefer et al. |
| 6,451,095 B1 | | 9/2002 | Keefer et al. |
| 6,565,628 B2 | | 5/2003 | Xu et al. |
| 6,565,635 B2 | | 5/2003 | Keefer et al. |
| 6,767,386 B2 | | 7/2004 | Kawai et al. |
| 6,916,358 B2 | | 7/2005 | Nakamura et al. |
| RE40,006 E | | 1/2008 | Keefer et al. |
| 7,645,324 B2 | | 1/2010 | Rode et al. |
| 7,651,549 B2 | | 1/2010 | Whitley |
| 7,670,408 B2 | | 3/2010 | Ota |
| 8,470,395 B2 | | 6/2013 | Khiavi et al. |
| 9,359,203 B2 | | 6/2016 | Kokubu et al. |
| 9,403,118 B2 | | 8/2016 | Sakamoto et al. |
| 9,669,349 B1 | | 6/2017 | Lau et al. |
| 9,895,646 B2 | | 2/2018 | Monereau et al. |
| 9,925,514 B2 | | 3/2018 | Coe et al. |
| 2014/0060326 A1 | | 3/2014 | Sundaram |
| 2014/0076164 A1 | | 3/2014 | Monereau et al. |
| 2017/0144101 A1 | | 5/2017 | Tanaka et al. |

FOREIGN PATENT DOCUMENTS

| | | |
|---|---|---|
| CN | 103787285 A | 5/2014 |
| CN | 101318634 B | 12/2014 |
| KR | 10-1659760 B1 | 9/2016 |
| WO | 2008/089564 A1 | 7/2008 |
| WO | 2017058486 A1 | 4/2017 |

OTHER PUBLICATIONS

Delgado, J.A., et al.; "Numerical Simulation of a Three-Bed PSA Cycle for the Methane/Nitrogen Separation with Silicalite"; Elsevier; Separation and Purification Technology; vol. 77; 2011; pp. 7-17.

Yavary, M., et al.; "The Effect of Number of Pressure Equalization Steps on the Performance of Pressure Swing Adsorption Process"; Elsevier, Chemical Engineering and Processing; vol. 87; 2015; pp. 35-44.

U.S. Appl. No. 15/718,620, filed Sep. 28, 2017 entitled Processes Using Improved RHO Adsorbent Compositions with first named inventor Shubhra Jyoti Bhadra.

U.S. Appl. No. 15/718,467, filed Sep. 28, 2017 entitled RHO Adsorbent Compositions, Methods of Making and Using Them with first named inventor Magdalena M. Lozinska.

Chagger, H.K., et al.; "Kinetics of Adsorption and Diffusional Characteristics of Carbon Molecular Services"; Pergamon; Elsevier Science Ltd.; Carbon vol. 33, No. 10; pp. 1405-1411; 1995.

Chen, Y.D., et al.; "Diffusion of Oxygen, Nitrogen and Their Mixtures in Carbon Molecular Sieve"; AIChE Journal; Apr. 1994; vol. 40, No. 4; pp. 577-585.

Kumar, R., et al.; "A Versatile Process Simulator for Adsorptive Separations"; Pergamon; Elsevier Science Ltd.; Chemical Enginering Science; 1994; vol. 49, No. 18; pp. 3115-3125.

Nakano, Y.; "Control of Micro-pores of Molecular Sieving Carbon by Impregnation of Hydrocarbons and Heat Treatment"; Presented at 20th Spring Chemical Industrial Convention; 19.

Reid, C.R., et al.; "Adsorption of Gases on Carbon Molecular Sieves Used for Air Separation. Spherical Adsorptives as Probes for Kinetic Selectivity"; Langmuir; 1998; 14; pp. 2415-2425.

Reid, C.R., et al.; "Adsorption of Gases on Carbon Molecular Sieve Used for Air Separation. Linear Adsorptives as Probes for Kinetic Selectivity"; Langmuir; 1999; 15; pp. 3206-3218.

Schork, J.M., et al.; "A Shortcut Computational Method for Designing $N_2$ PSA Adsorbents"; Ind. Eng. Chem. Res.; 1993; vol. 32; pp. 2226-2235.

Walker, P.L., Jr.; "Molecular Sieves"; Mineral Industries; Jan. 1966; pp. 1-7.

Nguyen, C. et al, "Dual Langmuir kinetic model for adsorption in carbon molecular sieve", Langmuir, vol. 16, pp. 1868-1873, 2000.

Sircar S. et al, "Why Does the Linear Driving Force Model for Adsorption Kinetics Work?", Adsorption 2000, 6, 137-147.

Mehrotra, A. et al, "Simplified Graphical Approach for Complex PSA Cycle Scheduling", Adsorption, 2011, 17 337-345.

* cited by examiner

Figure 1B

| Time → | | | | | | | | | | | | | | | | | | | |
|---|---|---|---|---|---|---|---|---|---|---|---|---|---|---|---|---|---|---|---|
| F1 | F2 | F3 | F4 | EQD1 | DEQD2 | DEQD3 | CnD1 | CnD2 | CnD3 | PU1 | PU2 | PU3 | PU4 | DEQR3 | DEQR2 | EQR1 | RP/F5 |
| F3 | F4 | EQD1 | DEQD2 | DEQD3 | CnD1 | CnD2 | CnD3 | PU1 | PU2 | PU3 | PU4 | DEQR3 | DEQR2 | EQR1 | RP/F5 | F1 | F2 |
| EQD1 | DEQD2 | DEQD3 | CnD1 | CnD2 | CnD3 | PU1 | PU2 | PU3 | PU4 | DEQR3 | DEQR2 | EQR1 | RP/F5 | F1 | F2 | F3 | F4 |
| DEQD3 | CnD1 | CnD2 | CnD3 | PU1 | PU2 | PU3 | PU4 | DEQR3 | DEQR2 | EQR1 | RP/F5 | F1 | F2 | F3 | F4 | EQD1 | DEQD2 |
| CnD2 | CnD3 | PU1 | PU2 | PU3 | PU4 | DEQR3 | DEQR2 | EQR1 | RP/F5 | F1 | F2 | F3 | F4 | EQD1 | DEQD2 | DEQD3 | CnD1 |
| PU1 | PU2 | PU3 | PU4 | DEQR3 | DEQR2 | EQR1 | RP/F5 | F1 | F2 | F3 | F4 | EQD1 | DEQD2 | DEQD3 | CnD1 | CnD2 | CnD3 |
| PU3 | PU4 | DEQR3 | DEQR2 | EQR1 | RP/F5 | F1 | F2 | F3 | F4 | EQD1 | DEQD2 | DEQD3 | CnD1 | CnD2 | CnD3 | PU1 | PU2 |
| DEQR3 | DEQR2 | EQR1 | RP/F5 | F1 | F2 | F3 | F4 | EQD1 | DEQD2 | DEQD3 | CnD1 | CnD2 | CnD3 | PU1 | PU2 | PU3 | PU4 |
| EQR1 | RP/F5 | F1 | F2 | F3 | F4 | EQD1 | DEQD2 | DEQD3 | CnD1 | CnD2 | CnD3 | PU1 | PU2 | PU3 | PU4 | DEQR3 | DEQR2 |

Bed →

PORT SEPARATION FOR ROTARY BED PSA

TECHNICAL FIELD

This disclosure relates to rotary bed pressure swing adsorption (PSA) apparatus, stator plates for rotary bed PSA apparatus, and rotary bed PSA processes.

BACKGROUND

Rotary valve and rotary bed technology provides an innovative platform to further improve conventional beaded and structured adsorbent based pressure swing adsorption (PSA) separation processes. For conventional beaded processes, the new technology plays an important role in enhancing the reliability and reducing the foot-print of a PSA plant. For structured adsorbent processes, the technology should aim to reduce the deleterious effects of mass transfer resistance and flow friction pressure drop whilst simultaneously maximizing specific productivity and recovery and eliminating risk of fluidization.

PSA processes typically operate with multiple beds and numerous cycle steps in which each bed undergoes a cyclic sequence of feed, equalization depressurization, blowdown, purge, equalization re-pressurization, and re-pressurization with product and/or feed steps. By way of example, a 9-bed multi-step PSA cycle schedule is presented in FIGS. 1A and 1B (referred to herein collectively as "FIG. 1") in which F (F1, F2, F3 and F4) indicates a feed step (also referred to herein as the adsorption step), EQD1 indicates an equalization depressurization step, DEQD2 indicates a dual equalization depressurization step, DEQD3 indicates a further dual equalization depressurization step, CnD (CnD1, CnD2 and CnD3) indicates a counter-current depressurization step (also referred to herein as a counter-current blowdown step), PU (PU1, PU2, PU3 and PU4) indicates a product purge step, DEQR3 indicates a dual equalization re-pressurization step, DEQR2 indicates a further dual equalization re-pressurization step, EQR1 indicates an equalization re-pressurization step, and RP/F5 indicates a re-pressurization with product and feed step. FIG. 1A shows the sequence of steps involved in one full PSA cycle and the gas flows into, out of or through a given bed in each step (for example, a given bed undergoes a feed step (F1 to F4) during the first four segment of times, then equalization depressurization step EQD1 during fifth segment of time with another bed that is undergoing equalization re-pressurization step EQR1, and so on). FIG. 1B is a table showing which step each adsorption bed is undergoing at each stage of the process, each row of the bed representing one of the 9 adsorption beds are placed along the vertical direction, and each column representing a segment of time of the cycle (wherein in the first segment of time the first bed as listed in the table is undergoing a first part, F1, of the feed step and the last bed is undergoing step EQR1, in the second segment of time the first bed is undergoing a second part, F2, of the feed step, and the last bed is undergoing step re-pressurization step RP/F5, and so on). Therefore, a row in the table in FIG. 1B represents all the cycle steps a bed undergoes over the entire cycle period and a column represents which cycle steps are being run by which bed at a particular time.

As is evident from the cycle schedule shown in FIG. 1B, in a multi-bed multi-step PSA process, more than one bed may be undergoing a particular step at the same time. For example, in the first segment of time the first and second beds are both undergoing part of their feed step (F1 and F3, respectively) at the same time.

As is also evident from the cycle schedule shown in FIG. 1B, at any particular point in time one or more beds may be undergoing a counter-current blowdown step (CnD1, CnD2, and CnD3) and one or more other beds may be undergoing a counter-current purge step (PU1, PU2, PU3, and PU4). In the blowdown step, a bed that is in the process of being regenerated is depressurized to a waste stream. This is followed by one or more purge steps, where contaminants are flushed from the bed using a low-pressure flow of product. During the blowdown step, flow from the bed being depressurized can be high, especially at the beginning, when bed pressure is the highest. By contrast, the purge step must be performed at a relatively low pressure to be most effective.

In a conventional PSA process, the blowdown and purge effluents are typically combined into the same exhaust stream. In the case of $N_2$ PSA, this is a waste stream, which is vented to the atmosphere. In PSA applications such as $H_2$ purification or biogas upgrading, the exhaust stream can be valuable and recycled as fuel, in which case a surge tank is normally installed to receive and to mix exhaust streams from all steps, including blowdown, bed to bed purge and product purge steps. For $H_2$ PSA, the flow and pressure variation to the exhaust surge tank should be minimized to reduce the variation of Wobbe Index of the exhaust fuel.

In a rotary-bed PSA process the adsorption beds are located in a rotor assembly that is positioned between first and second stator assemblies, each bed having a rotor port at either end of the bed via which gas enters or exits the bed, the rotor assembly being rotated relative to the first and second stator assemblies in order to change the operating modes of the beds (i.e. to change which step of the PSA cycle is taking place in the beds). More specifically, the first and second stator assemblies each include a stator plate having a plurality of slots therein for directing flow of gas to and from the adsorption beds, and rotation of the rotor assembly changes which rotor ports are in alignment with which slots in the stator plates in order to change the operating modes of the beds. Thus, the stator plates and slots therein provide switching valve action for switching the operating modes of the adsorption beds. In order to minimize the number of slots that are needed in the stator plates, it is also conventional for the stator assembly that has the exhaust port or ports for removing the blowdown and purge effluents (i.e. the blowdown and purge exhaust gas streams) to have a stator plate that has a single slot, also referred to herein as an exhaust slot, for receiving all of the exhaust gas streams from all of the beds that are undergoing blowdown or purge steps at the same time. The blowdown and purge effluents can then be combined, as discussed above, in said slot into a single exhaust stream that is directed to the exhaust port of the apparatus.

U.S. Pat. No. 8,470,395 discloses a multi-bed rapid kinetic PSA apparatus utilizing a parallel passage structured adsorbent comprising of a laminated adsorbent sheet (SAPO-34) to separate carbon dioxide ($CO_2$) from a gas mixture comprising methane ($CH_4$). Stator plates are employed to open and close the adsorbent beds to feed and exhaust the process gases. A 28-bed multi-step PSA cycle consisting of production, equalization, reflux (at ambient and sub-ambient pressures), evacuation, product purge and re-pressurization (with feed and product) steps is used to evaluate process performance indicators. The reflux steps are incorporated to enhance the recovery of methane ($CH_4$). In one embodiment multiple exhaust ports are used to reduce pressure drop through those ports by dividing the flow and reducing the gas velocity.

Another example of such a rotary bed process is given in WO 2008/089564, which focuses on technology for sealing valve surfaces including stator plate surfaces of a rotary PSA apparatus. Disclosed therein is a design using two exhaust ports for collecting exhaust streams at different pressure levels, so that if an exhaust compressor is utilized to further process the exhaust gas the size of the compressor can be significantly reduced.

SUMMARY

Disclosed herein are novel rotary bed pressure swing adsorption (PSA) apparatus, stator plates for rotary bed PSA apparatus, and rotary bed PSA processes using the same.

It has now been found that it can be beneficial to partially or fully split the exhaust slot in the stator plate of a rotary bed PSA apparatus that handles the blowdown and purge exhaust gas streams, such that the exhaust slot in said stator plate has first and second sections for separately handling the purge and blowdown exhaust gas streams, said sections being separated by a flow restriction that limits gas flow between the sections, or such that there are separate exhaust slots in said stator plate for separately handling the blowdown and purge exhaust gas streams.

Several preferred aspects of the apparatus, stator plates and processes according to the present invention are outlined below.

Aspect 1: A rotary bed pressure swing adsorption (PSA) apparatus comprising a rotor assembly and first and second stator assemblies, wherein:

the rotor assembly is positioned between the first and second stator assemblies and comprises a plurality of adsorption beds each bed having a rotor port at either end of the bed via which gas enters or exits said bed, the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s), and the second stator assembly comprises at least one product port and a second stator plate having at least one product slot for directing flow of at least one product gas stream between the product(s) port and any of the rotor ports that are in alignment with the slot and at least one purge slot for directing flow of at least one purge gas stream into any of the rotor ports that are in alignment with the slot, the rotor assembly being rotatable relative to the first and second stator assemblies so as to change the operating modes of individual adsorption beds by changing which rotor ports are in alignment with which slots in the first and second stator plates, wherein when the rotor ports of a bed are in alignment with a feed slot and/or a product slot that bed is in re-pressurization mode or feed mode, when the rotor ports of a bed are in alignment with an exhaust slot and a purge slot that bed is in purge mode, and when the rotor ports of a bed are in alignment with an exhaust slot and are not in alignment with a purge slot that bed is in blowdown mode, and wherein either:

a) the at least one exhaust slot in the first stator plate comprises an exhaust slot that has a first section that is configured to receive a purge exhaust gas stream from at least one adsorption bed in purge mode and a second section that is configured to receive simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections being separated by a flow restriction that is configured to restrict but not fully prevent gas flow between the sections; or b) the at least one exhaust slot in the first stator plate comprises a first exhaust slot that is configured to receive a purge exhaust gas stream from at least one adsorption bed in purge mode, and a separate second exhaust slot that is configured to receive simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

Aspect 2: The rotary bed PSA apparatus of Aspect 1, wherein the at least one exhaust slot in the first stator plate comprises an exhaust slot that has a first section that is configured to receive a purge exhaust gas stream from at least one adsorption bed in purge mode and a second section that is configured to receive simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections being separated by a flow restriction that is configured to restrict but not fully prevent gas flow between the sections.

Aspect 3: The rotary bed PSA apparatus of Aspect 2, wherein said flow restriction separating the first and second sections of the exhaust slot comprises at least one physical barrier disposed within the slot that reduces the open cross sectional area of the slot at the location of the physical barrier through which gas can flow.

Aspect 4: The rotary bed PSA apparatus of Aspect 3, wherein said at least one physical barrier comprises a barrier disposed within the slot that extends across the full width of the slot and from the floor of the slot to a height that is less than the full height of the slot.

Aspect 5: The rotary bed PSA apparatus of Aspect 3 or 4, wherein the open cross sectional area of the slot at the location of the physical barrier is from 1% to 50% of the maximum cross sectional area of the slot at any other location.

Aspect 6: The rotary bed PSA apparatus of Aspect 3 or 4, wherein the open cross sectional area of the slot at the location of the physical barrier is from 1% to 20% of the maximum cross sectional area of the slot at any other location.

Aspect 7: The rotary bed PSA apparatus of any one of Aspects 3 to 6, wherein the width of the physical barrier, in the circumferential direction of the plate, is at its narrowest point less than the diameter of the rotor ports.

Aspect 8: The rotary bed PSA apparatus of Aspect 1, wherein the at least one exhaust slot in the first stator plate comprises a first exhaust slot that is configured to receive a purge exhaust gas stream from at least one adsorption bed in purge mode, and a separate second exhaust slot that is configured to receive simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

Aspect 9: The rotary bed PSA apparatus of Aspect 8, wherein the first exhaust slot is configured to receive a plurality of purge exhaust gas streams from a plurality of adsorption beds in purge mode, and/or the second exhaust slot is configured to receive a plurality of blowdown exhaust gas streams from a plurality of other adsorption beds in blowdown mode.

Aspect 10: The rotary bed PSA apparatus of Aspect 8 or 9, wherein the section of the stator plate separating the first and second exhaust slots has a width, in the circumferential direction of the plate, that at its narrowest point is less than the diameter of the rotor ports.

Aspect 11: The rotary bed PSA apparatus of any one of Aspects 1 to 10, wherein said two separate outlets from said first and second sections of the exhaust slot or from said first and second exhaust slots are in fluid communication with the same exhaust port of the first stator assembly, said separate outlets being connected to the exhaust port via an exhaust manifold that receives both exhaust gas streams from both outlets, wherein the cross-sectional area of the exhaust manifold is greater than the cross section area of the exhaust slot or slots.

Aspect 12: The rotary bed PSA apparatus of any one of Aspects 1 to 11, wherein either:

a) the at least one feed slot in the first stator plate comprises a feed slot that has a first section that is configured to direct a first feed gas stream to at least one adsorption bed in re-pressurization or feed mode and a second section that is configured to direct a second feed gas stream to at least one other adsorption bed in feed mode, said first section having an inlet for receiving the first feed gas stream and said second section having a separate inlet for separately receiving the second feed gas stream, the first and second sections being separated by flow restriction that is configured to restrict but not fully prevent gas flow between the sections; or b) the at least one feed slot in the first stator plate comprises a first feed slot that is configured to direct a first feed gas stream to at least one adsorption bed in re-pressurization or feed mode, and a separate second feed slot that is configured to direct a second feed gas stream to at least one other adsorption bed in feed mode, the first feed slot having an inlet for receiving the first feed gas stream and the second feed slot having a separate inlet for separately receiving the second feed gas stream.

Aspect 13: The rotary bed PSA apparatus of any one of Aspects 1 to 12, wherein either:

a) the at least one product slot in the second stator plate comprises a product slot that has a first section that is configured to direct a first product gas stream to at least one adsorption bed in re-pressurization mode or receive a first product gas stream from at least one adsorption bed in feed mode and a second section that is configured to receive a second product gas stream from at least one other adsorption bed in feed mode, said first section having an inlet for receiving or outlet for discharging the first product gas stream and said second section having a separate outlet for separately discharging the second product gas stream, the first and second sections being separated by flow restriction that is configured to restrict but not fully prevent gas flow between the sections; or b) the at least one product slot in the first stator plate comprises a first product feed slot that is configured to direct a first product gas stream to at least one adsorption bed in re-pressurization mode or receive a first product gas stream from at least one adsorption bed in feed mode, and a separate second product slot that is configured to receive a second product gas stream from at least one other adsorption bed in feed mode, the first product slot having an inlet for receiving or outlet for discharging the first product gas stream and the second product slot having a separate outlet for separately discharging the second product gas stream.

Aspect 14: A stator plate for a rotary bed pressure swing adsorption (PSA) apparatus, wherein the stator plate has at least one feed slot configured to be capable of directing at least one feed gas stream to at least one adsorption bed of the rotary bed PSA apparatus that is in re-pressurization or feed mode, and wherein either:

a) the stator plate further has an exhaust slot that has a first section that is configured to be capable of receiving a purge exhaust gas stream from at least one adsorption bed of the rotary bed PSA apparatus that is in purge mode and a second section that is configured to be capable of receiving simultaneously a blowdown exhaust gas stream from at least one other adsorption bed of the rotary bed PSA apparatus that is in blowdown mode, said first section having an outlet for discharging the purge exhaust gas stream from the stator plate and said second section having a separate outlet for separately discharging the blowdown exhaust gas stream from the stator plate, the first and second sections of the slot being separated by a flow restriction that is configured to restrict but not fully prevent gas flow between the sections; or b) the stator plate further has a first exhaust slot that is configured to be capable of receiving a purge exhaust gas stream from at least one adsorption bed of the rotary bed PSA apparatus that is in purge mode, and has a separate second exhaust slot that is configured to be capable of receiving simultaneously a blowdown exhaust gas stream from at least one other adsorption bed of the rotary bed PSA apparatus that is in blowdown mode, the first exhaust slot having an outlet for discharging the purge exhaust gas stream from the stator plate and the second exhaust slot having a separate outlet for separately discharging the blowdown exhaust gas stream from the stator plate.

Aspect 15: The stator plate of Aspect 14, wherein the stator plate is as further defined in any of Aspects 2 to 10 and 12.

Aspect 16: A rotary bed pressure swing adsorption (PSA) process comprising subjecting each of a plurality of adsorption beds to a PSA cycle comprising a feed step during which the adsorption bed is in feed mode, a blowdown step during which the adsorption bed is in blowdown mode, a purge step during which the adsorption bed is in purge mode, an a re-pressurization step during which the adsorption bed is in re-pressurization mode, wherein:

the adsorption beds are located in a rotor assembly that is positioned between the first and second stator assemblies, each bed having a rotor port at either end of the bed via which gas enters or exits said bed, the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s), the second stator assembly comprises at least one product port and a second stator plate having at least one product slot for directing flow of at least one product gas stream between the product port(s) and any of the rotor ports that are in alignment with the slot at least one purge slot for directing flow of at least one purge gas stream into any of the rotor ports that are in alignment with the slot, the rotor assembly being rotated relative to the first and second stator assemblies so as to change the operating modes of individual adsorption beds by changing which rotor ports are in alignment with which slots in the first and second stator plates, wherein when the rotor ports of a bed are in alignment with a feed slot and/or a product slot that bed is in re-pressurization or feed mode, when the rotor ports of a bed are in alignment with an exhaust slot and a purge slot that bed is in purge mode, and when the rotor ports of a bed are in alignment with an exhaust slot and are not in alignment with a purge slot that bed is in blowdown mode, and wherein either:

a) the at least one exhaust slot in the first stator plate comprises an exhaust slot that has a first section that receives a purge exhaust gas stream from at least one adsorption bed in purge mode and a second section that receives simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections of the slot being separated by a flow restriction that restricts but does not fully prevent gas flow between the sections; or b) the at least one exhaust slot in the first stator plate comprises a first exhaust slot that receives a purge exhaust gas stream from at least one adsorption bed in purge mode, and a separate second exhaust slot that receives simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

Aspect 17: The rotary bed PSA process of Aspect 16, wherein the at least one exhaust slot in the first stator plate comprises an exhaust slot that has a first section that receives a purge exhaust gas stream from at least one adsorption bed in purge mode and a second section that receives simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections of the slot being separated by a flow restriction that restricts but does not fully prevent gas flow between the sections.

Aspect 18: The rotary bed PSA process of Aspect 17, wherein said flow restriction separating the first and second sections of the exhaust slot comprises at least one physical barrier disposed within the slot that reduces the open cross sectional area of the slot at the location of the physical barrier through which gas can flow.

Aspect 19: The rotary bed PSA process of Aspect 18, wherein said at least one physical barrier comprises a barrier disposed within the slot that extends across the full width of the slot and from the floor of the slot to a height that is less than the full height of the slot.

Aspect 20: The rotary bed PSA process of Aspect 18 or 19, wherein the open cross sectional area of the slot at the location of the physical barrier is from 1% to 50% of the maximum cross sectional area of the slot at any other location.

Aspect 21: The rotary bed PSA process of Aspect 18 or 19, wherein the open cross sectional area of the slot at the location of the physical barrier is from 1% to 20% of the maximum cross sectional area of the slot at any other location.

Aspect 22: The rotary bed PSA process of any one of Aspects 18 to 21, wherein the width of the physical barrier, in the circumferential direction of the plate, is at its narrowest point less than the diameter of the rotor ports Aspect 23: The rotary bed PSA process of Aspect 16, wherein the at least one exhaust slot in the first stator plate comprises a first exhaust slot that receives a purge exhaust gas stream from at least one adsorption bed in purge mode, and a separate second exhaust slot that receives simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

Aspect 24: The rotary bed PSA process of Aspect 23, wherein the first exhaust slot receives a plurality of purge exhaust gas streams from a plurality of adsorption beds in purge mode, and/or the second exhaust slot receives a plurality of blowdown exhaust gas streams from a plurality of other adsorption beds in blowdown mode.

Aspect 25: The rotary bed PSA process of Aspect 23 or 24, wherein the section of the stator plate separating the first and second exhaust slots has a width, in the circumferential direction of the plate, that at its narrowest point is less than the diameter of the rotor ports Aspect 26: The rotary bed PSA process of any one of Aspects 16 to 25, wherein said two separate outlets from said exhaust slot or said first and second exhaust slots direct the exhaust gas streams to the same exhaust port of the first stator assembly, said separate outlets being connected to the exhaust port via an exhaust manifold that receives both exhaust gas streams from both outlets, wherein the cross-sectional area of the exhaust manifold is greater than the cross section area of the exhaust slot or slots.

Aspect 27: The rotary bed PSA process of any one of Aspects 16 to 26, wherein either:

a) the at least one feed slot in the first stator plate comprises a feed slot that has a first section that directs a first feed gas stream to at least one adsorption bed in re-pressurization or feed mode and a second section that directs a second feed gas stream to at least one other adsorption bed in feed mode, said first section having an inlet for receiving the first feed gas stream and said second section having a separate inlet for separately receiving the second feed gas stream, the first and second sections being separated by flow restriction that restricts but not fully prevent gas flow between the sections; or b) the at least one feed slot in the first stator plate comprises a first feed slot that directs a first feed gas stream to at least one adsorption bed in re-pressurization or feed mode, and a separate second feed slot that directs a second feed gas stream to at least one other adsorption bed in feed mode, the first feed slot having an inlet for receiving the first feed gas stream and the second feed slot having a separate inlet for separately receiving the second feed gas stream.

Aspect 28: The rotary bed PSA process of any one of Aspects 16 to 27, wherein either:

a) the at least one product slot in the second stator plate comprises a product slot that has a first section that directs a first product gas stream to at least one adsorption bed in re-pressurization mode or receives a first product gas stream from at least one adsorption bed in feed mode and a second section that receives a second product gas stream from at least one other adsorption bed in feed mode, said first section having an inlet for receiving or outlet for discharging the first product gas stream and said second section having a separate outlet for separately discharging the second product gas stream, the first and second sections being separated by flow restriction that restricts but not fully prevent gas flow between the sections; or b) the at least one product slot in the first stator plate comprises a first product slot that directs a first product gas stream to at least one adsorption bed in re-pressurization mode or receives a first product gas stream from at least one adsorption bed in feed mode, and a separate second product slot that receives a second product gas stream from at least one other adsorption bed in feed mode, the first product slot having an inlet for receiving or outlet for discharging the first product gas stream and the second product slot having a separate outlet for separately discharging the second product gas stream.

DETAILED DESCRIPTION

Figure 1A:
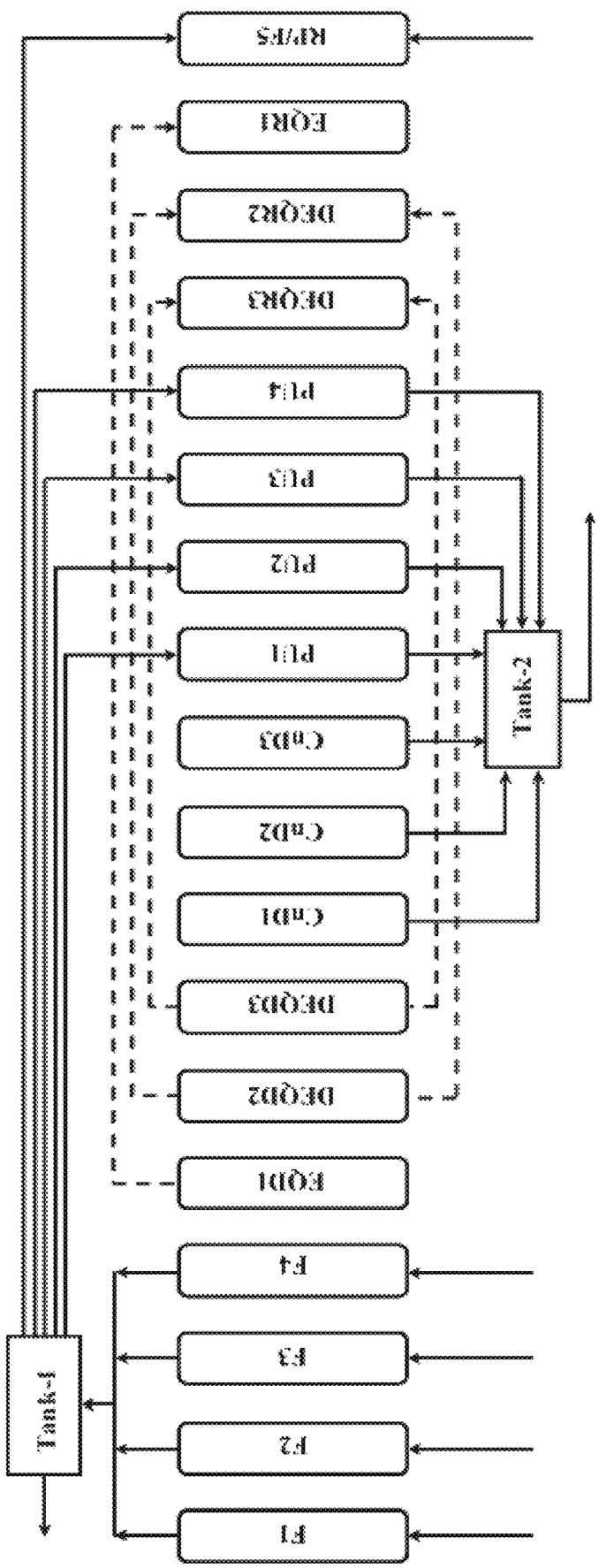
FIG. 1 depicts a 9-bed multi-step PSA cycle, FIG. 1A being a schematic that depicts the sequence of steps involved in one full PSA cycle and the gas flows into, out of or through a given bed in each step, and FIG. 1B being a table showing which step each adsorption bed is undergoing at each stage of the process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "first," "second," "third," etc. are used to distinguish from among a plurality of steps and/or features, and are not indicative of the total number, or relative position in time and/or space unless expressly stated as such.

As used herein, the term "comprising" means consisting of or including.

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

Described herein are rotary bed pressure swing adsorption (PSA) apparatus, stator plates for rotary bed PSA apparatus, and rotary bed PSA processes using the same.

As discussed above and as is well known, a PSA cycle includes a feed step (adsorption step) during which a feed gas stream (typically a compressed stream at above atmospheric pressure) is introduced into and passed through an adsorbent bed undergoing the feed step (i.e. a bed in feed mode) to adsorb one or more components from the feed stream, thereby producing a product gas stream exiting the bed that is depleted (relative to the composition of the feed gas stream) in the adsorbed component. The PSA cycle further includes a blowdown step in which the bed undergoing the blowdown step (i.e. the bed in blowdown mode) is depressurized down to a lower pressure (typically to a pressure at or near atmospheric pressure, or to a sub-atmospheric pressure in the event a vacuum pump is used) than the pressure during the adsorption step by exhausting gas from the bed, thereby producing blowdown exhaust gas stream exiting the bed; and a purge step after the blowdown step (and at said lower pressure) in which a purge gas, which is often some of the product gas obtained from the feed step of the cycle, is passed through the depressurized bed undergoing the purge step (i.e. the bed in purge mode) to flush adsorbed components from the bed thereby producing purge exhaust gas stream exiting the bed. Finally, the PSA cycle also includes a re-pressurization step in which the bed undergoing the re-pressurization step (i.e. the bed in re-pressurization mode) is re-pressurized, typically using feed gas or both feed and product gas, back to the pressure used for the feed step. Typically the blowdown and purge steps are counter-current steps. As used herein in relation to a PSA cycle, the term "counter-current" refers to a step in which gas flows through a bed in the opposite direction to the direction during the feed step, and the term "co-current" refers to a step in which gas flows through a bed in the same direction to the direction during the feed step.

As also discussed above, in a rotary-bed PSA process and apparatus the adsorption beds are located in a rotor assembly that is positioned between first and second stator assemblies, each adsorption bed having a rotor port at either end of the bed via which gas can exit or enter the bed. Where the PSA process involves counter-current blowdown and purge steps, typically the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s), and the second stator assembly comprises at least one product port and a second stator plate having at least one product slot for directing flow of at least one product gas stream between the product port(s) and any of the rotor ports that are in alignment with the slot and at least one purge slot for directing flow of at least one purge gas into any of the rotor ports that are in alignment with the slot. The rotor assembly is rotated relative to the first and second stator assemblies so as to change the operating modes of individual adsorption beds by changing which rotor ports are in alignment with which slots in the first and second stator plates, wherein when the rotor ports of a bed are in alignment with a feed slot and/or a product slot that bed is in re-pressurization mode or feed mode, when the rotor ports of a bed are in alignment with an exhaust slot and a purge slot that bed is in purge mode, and when the rotor ports of a bed are in alignment with an exhaust slot and are not in alignment with a purge slot it is in blowdown mode.

Figure 2:
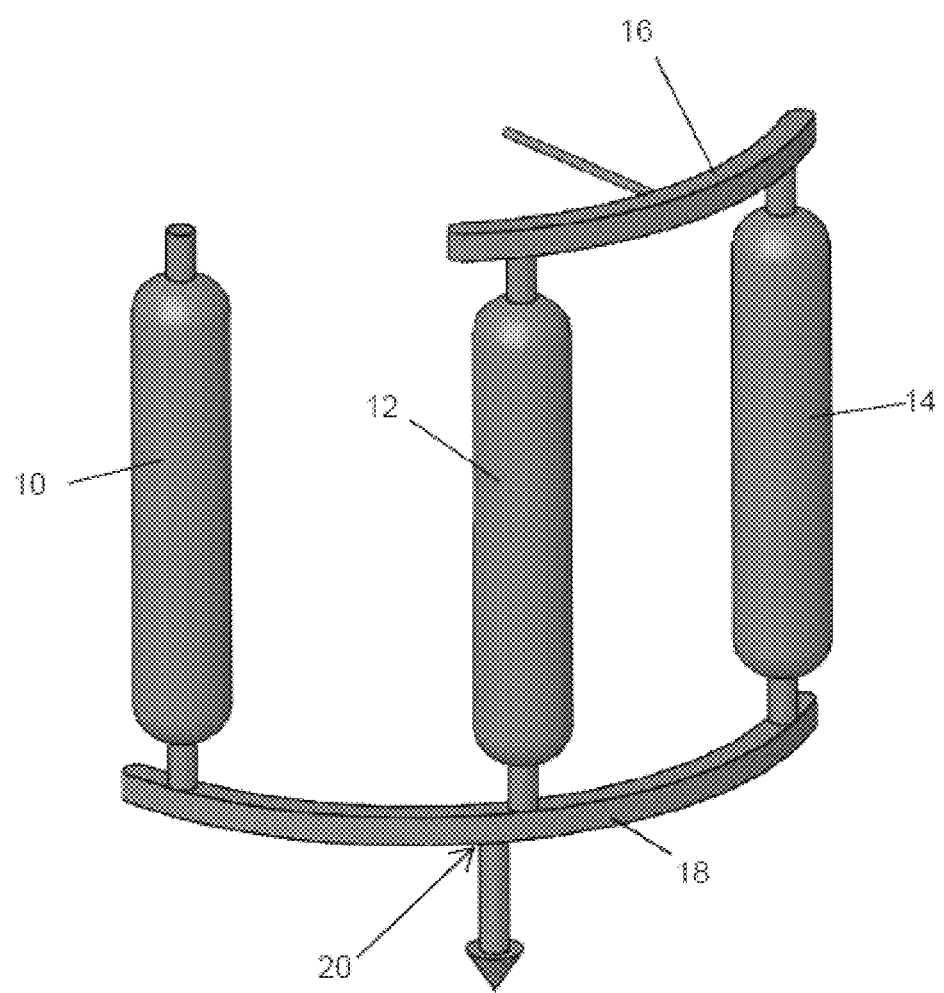
FIG. 2 is a simplified schematic depicting the flow of the blowdown and purge exhaust gas streams in a prior art rotary bed PSA apparatus and process.

As further discussed above, in a conventional PSA process, the blowdown and purge exhaust gas streams are typically combined into a single exhaust stream. In the case of a conventional rotary bed PSA process and apparatus this involves using a first stator assembly having a first stator plate that has a single exhaust slot for simultaneously receiving all of the exhaust gas streams from all of the beds that are in blowdown or purge mode. FIG. 2 depicts schematically the flow of the blowdown and purge exhaust gas streams in such an arrangement. More specifically, FIG. 2 depicts an arrangement in which adsorption bed 10 is in blowdown mode and adsorption beds 12 and 14 are in purge mode, a purge gas being directed via a purge slot 16 in the second stator plate (not shown) into the beds 12 and 14 in purge mode, and the exhaust gas streams leaving the beds 10, 12 and 14 being received by a single exhaust slot 18 in the first stator plate (not shown) and being directed to an exhaust port (not shown) via a single outlet 20 from the exhaust slot.

During the blowdown step flow from the bed being depressurized can be relatively high, as compared to the flow from the beds undergoing the purge steps, this particularly being so at the beginning of the blowdown step when bed pressure is at its highest point during said step. By contrast, the purge step must be performed at a respectively low pressure to be most effective. This does not present an issue for a conventional (i.e. non-rotary bed) PSA apparatus as in such an apparatus the pipes and manifolds leading from the beds can be of relatively large diameter, and the valves controlling flow of gas from the beds can be of a type where the total flow area of the valve is essentially immediately available at the start of a cycle step in which the valve is opened. However, in a rotary bed process such as depicted in FIG. 2, where the exhaust slot has a limited volume due to the physical restrictions governed by the physical dimensions of the stator plate, and where the total area of the exhaust slot may only become available for receiving flow somewhere in the middle of a cycle step, this can cause a problem wherein the high flow from the blowdown step and limited volume of the exhaust slot can result in a significant backpressure in the exhaust slot that can inhibit flow of gas through the bed being purged. In severe cases, the backpressure may even be sufficient to reverse the direction of flow into one or more of the beds in purge mode, wherein gas in the exhaust slot is forced into said beds in purge mode instead of a purge exhaust gas stream exiting said beds.

Figure 3:
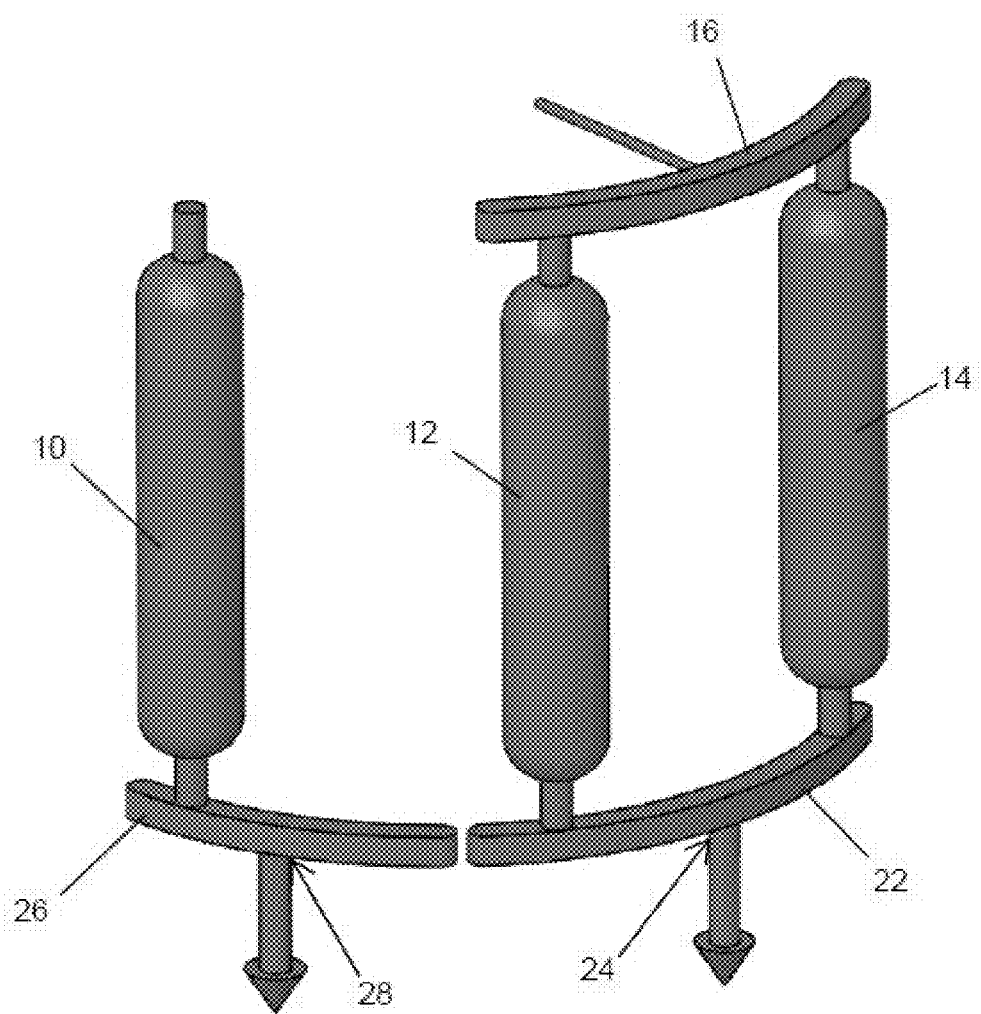
FIG. 3 is a simplified schematic depicting the flow of the blowdown and purge exhaust gas streams in accordance with an embodiment of the present invention.

However, it has now been found that partially or fully splitting the exhaust slot in the first stator plate of a rotary bed PSA apparatus, such that the exhaust slot in said stator plate has first and second sections for separately handling the purge and blowdown exhaust gas streams, said sections being separated by a flow restriction that limits gas flow between the sections, or such that there are separate exhaust slots in said stator plate for separately handling the blowdown and purge exhaust gas streams, is an effective way of preventing this reverse flow issue. FIG. 3 depicts schematically the flow of the blowdown and purge exhaust gas streams in an arrangement where the exhaust slot has been fully split into two separate exhaust slots for separately handling the blowdown and purge exhaust gas streams (since the slots are separate, it follows that there is no flow path through the stator plate between the slots for gas flow between the slots). More specifically, FIG. 3 depicts an arrangement in which adsorption bed 10 is in blowdown mode and adsorption beds 12 and 14 are in purge mode, a purge gas being directed via a purge slot 16 in the second stator plate (not shown) into the beds 12 and 14 in purge mode. The exhaust gas streams leaving the beds 12 and 14 in purge mode is received by a first exhaust slot 22 in the first stator plate (not shown) and is discharged to an exhaust port (not shown) via an outlet 24 from the first exhaust slot 22. The exhaust gas streams leaving the bed 10 in blowdown mode is received by a second exhaust slot 26 in the first stator plate (not shown) and is discharged to the same or a different exhaust port (not shown) via a separate outlet 28 from the second exhaust slot 26. In this way, the two exhaust gas streams (blowdown and purge) do not interfere with each other, and the reverse flow issue is obviated.

In arrangements where the exhaust slot in the first stator plate is only partially split, such that the exhaust slot has first and second sections for separately handling the purge and blowdown exhaust gas streams, said sections being separated by a flow restriction that limits gas flow between the sections, the reverse flow issue can still be overcome. At the same time, it has been found that by only partially dividing the exhaust slot in this way so that some mixing between the two exhaust gas streams within the slot can occur, it is possible to adjust and thus balance gas flows in the feed or exhaust steps. The flow restriction can be a physical barrier that, for example, extends across the full width of the slot and from the floor of the slot to a height that is less than the full height of the slot. The flow resistance and thus degree to which mixing of the exhaust gas streams is impeded can be varied by adjusting the size and/or shape of the physical barrier.

In a PSA process, it is preferable to have relatively longer time and/or less flow resistance on exhaust steps, if other steps are not affected. One benefit specific to only partially splitting the exhaust slot is the ability to eliminate any sacrifice on exhaust time. Although fully splitting the exhaust slot into two separate exhaust slots can provide total segregation of the exhaust streams in the stator plate and thus eliminate any interference between the blowdown and purge steps (specifically eliminating any risk of backflow in the adsorption bed in purge mode), it also blocks a portion of the exhaust gas flow path in the stator plate and removes a portion of cycle time which can be otherwise used for desorption and bed cleaning. This reduced time on exhaust steps can result in less complete bed desorption. Partially splitting the exhaust slot therefore provides a potential dual benefit in eliminating reverse flow in the purge steps and whilst avoiding loss of some exhaust time that could result from using completely separate exhaust slots.

A further advantage of partially or fully splitting the exhaust slot is that it stiffens the first stator plate, which limits deformation of said stator plate during operation and thus helps maintain a flat sealing surface between the first stator assembly and rotor assembly during operation. During operation, high pressure and high temperature in the feed slot and low pressure and low temperature in the exhaust slot(s) will produce stresses in the stator plate that cause deformation. A flat sealing surface is required to minimize process gas leakage and maximize PSA efficiency, thus reducing deformation of the stator plate during operation is clearly advantageous.

Once the blowdown and purge exhaust gas streams have been discharged separately from the first stator plate, via the aforementioned separate outlets from the partially or fully split exhaust slot, they can be kept separate and sent to different exhaust ports of the first stator assembly. Alternatively, they can be combined and sent to a common exhaust port of the first stator assembly via an exhaust manifold that receives both exhaust gas streams. By combining the exhaust gas streams in an exhaust manifold that is downstream of the exhaust slot or slots, and has a cross-sectional area that is greater than the cross section area of the exhaust slot or slots, the streams can be combined and discharged together without creating significant backpressure in the exhaust slot or slots.

Figure 4:
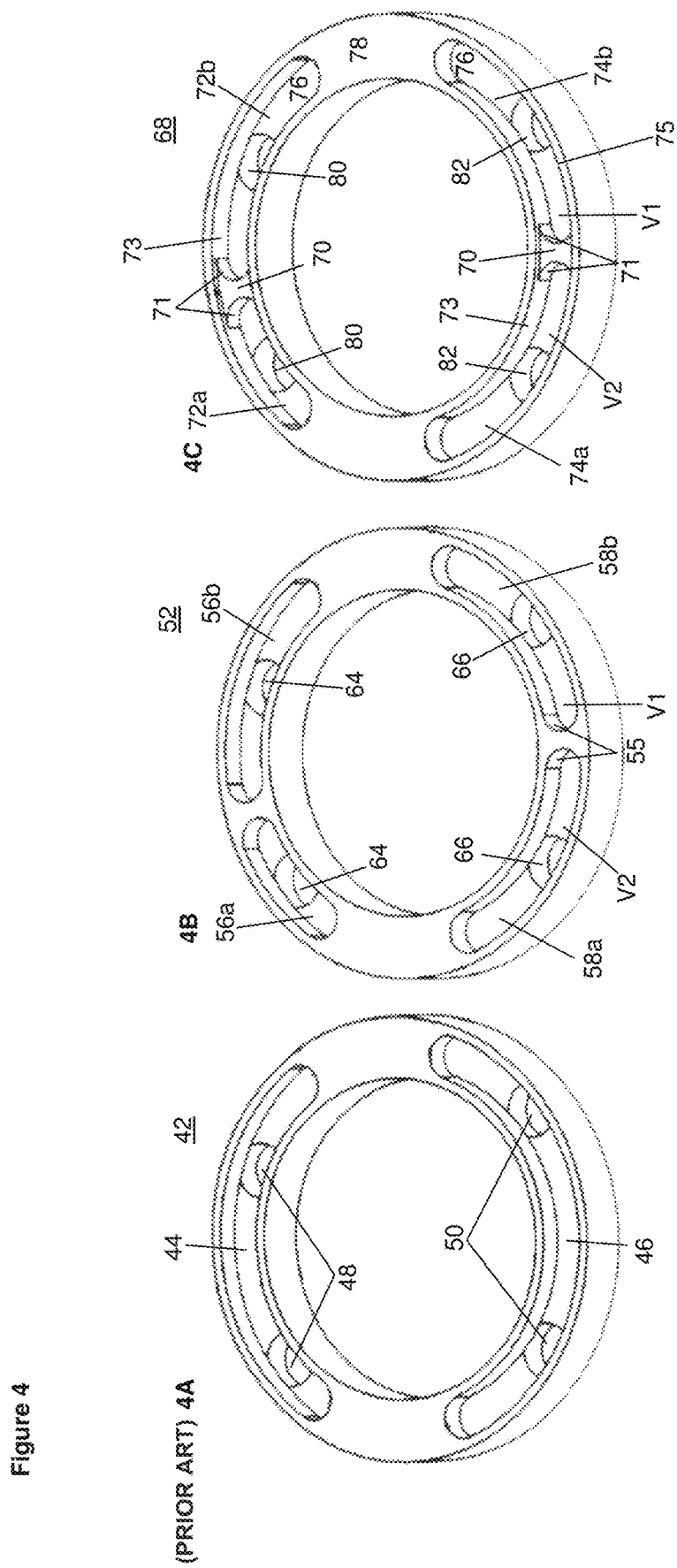
FIG. 4 is a simplified depiction of a prior art stator plate (FIG. 4A) and stator plates according to embodiments of the present invention (FIGS. 4B and 4C).

FIG. 4A shows a simplified depiction of a first stator plate 42 for a rotary PSA apparatus in accordance with the general teaching in the prior art (also referred to hereinafter as a "single slot" or "single port" stator plate), wherein the stator plate has a feed slot 44 for receiving the feed gas streams, and a single exhaust slot 46 for receiving all exhaust gas streams. The feed slot 44 has one or more inlets 48 for receiving the feed gas and the exhaust slot 46 has one or more outlets 50 for discharging exhaust gas (i.e. the blowdown and purge gas streams) from the exhaust slot 46.

Figure 5:
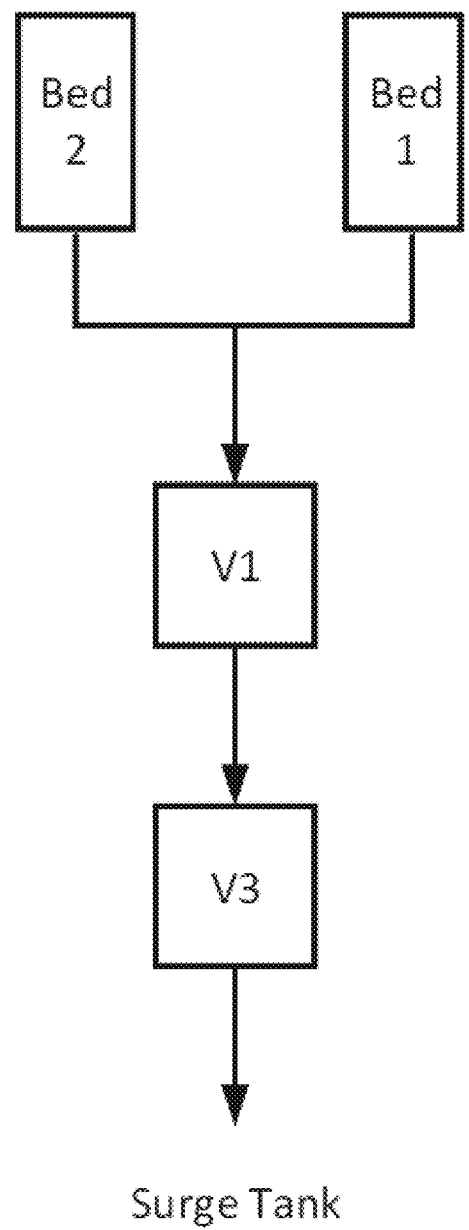
FIG. 5 is a simplified schematic depicting the flow of the blowdown and purge exhaust gas streams in a rotary bed PSA apparatus and process using the stator plate of FIG. 4A.

FIG. 5 provides simplified depiction of the flow of the blowdown and purge exhaust gas streams in a rotary bed PSA apparatus and process using the "single port" stator plate of FIG. 4A. The exhaust gas streams from two beds, Bed 1 (in blowdown mode) and Bed 2 (in purge mode), is directed to the single exhaust slot 46, having a volume V1. The gas discharged from the single exhaust slot 46 enters to an exhaust manifold, having a volume V3, and finally is sent to an exhaust surge tank.

As described above (and further shown in the following Examples), this configuration leads to backflow problems and stator plate deformation during operation of the rotary PSA apparatus.

FIG. 4B shows a first stator plate 52 in accordance with an embodiment of the present invention, wherein the stator plate has separate first and second exhaust slots for receiving, respectively, the purge and blowdown exhaust gas streams (such an arrangement also being referred to herein after as a "dual slot" or "dual port" stator plate).

The stator plate 52 has first and second exhaust slots 58a and 58b, having respectively volumes V2 and V1, for receiving respectively a purge gas exhaust stream and a blowdown exhaust gas stream. The sizes of the two exhaust slots 58a and 58b, and hence the size of volumes V2 and V1, can be adjusted by varying the size and/or location of the section of the stator plate separating the two slots from each other. The first exhaust slot 58a has an outlet 66 for discharging a purge exhaust gas stream from the slot, and the second exhaust slot 58b has a separate outlet 66 for discharging a blowdown exhaust gas stream from the slot. Optionally, outlets 66 may be connected to separate pipes terminating in separate exhaust ports, or they may be connected to a single large common exhaust manifold, sized to avoid backpressure in the exhaust slots.

The two internal end walls 55 of two exhaust slots 58a and 58b that are nearest to each other are preferably of a concave shape in order to provide rounded end walls in each slot, which minimizes the stress on the walls 55 caused by gas pressure in the slots 58a and 58b when in use.

It is preferred that the width (in the circumferential direction of the stator plate) of the section of the stator plate separating the two end walls 55 of the two slots 58a and 58b from each other is, at its narrowest point, less than the diameter of the rotor ports of the beds (which will typically all have a diameter that matches or is similar to the width in the radial direction of the stator plate of the slots in the stator plate). Doing so prevents full shut off of the rotor port of a bed as it moves over the section of the stator plate separating the two slots 58a and 58b (thus minimizing downtime of the bed as it switches modes), which still enables isolation of the blowdown exhaust gas stream from the purge exhaust gas stream at, in particular, the start of the blowdown step (which the pressure in the bed in blowdown mode it at its highest).

In the depicted embodiment, the stator plate 52 has also two separate feed slots 56a and 56b. The two feed slots 56a and 56b each have inlet 64 for receiving a feed gas stream. Dividing the feed slot into two separate slots has similar benefits to dividing the exhaust slot in terms of stiffening the stator plate, and may be particularly useful where PSA cycle has a long feed step that would otherwise require a correspondingly long feed slot receiving high pressure feed gas for delivery to several beds in feed mode. Equally, in comparison to a stator plate that uses a single feed slot for delivering feed gas to both a bed in re-pressurization mode (e.g. undergoing step RP/F5 in FIG. 1) and to one or more beds in feed mode (e.g. undergoing step F1/F2/F3/F4 in FIG. 1), it may be helpful to have a feed slot for delivering feed gas to a bed in re-pressurization mode and a separate feed slot for delivering feed gas to the bed(s) in feed mode, so as to avoid backflow, via the feed slot, from a bed in feed mode to a bed in re-pressurization mode at the start of the re-pressurization step (when pressure in the bed in re-pressurization mode is at its lowest point), which will typically result in undesired pressure loss in the bed in feed mode. The preferred characteristics (i.e. shape, dimensions, etc.) of the section of the stator plate separating the two feed slots 56a and 56b are as described above in relation to the section of the stator plate separating the two exhaust slots 58a and 58b.

Whilst the embodiment depicted in FIG. 4B has two feed slots 56 and a two exhaust slots 58, in other embodiments the stator plate could have fewer or more feed slots and/or more exhaust slots.

Figure 6:
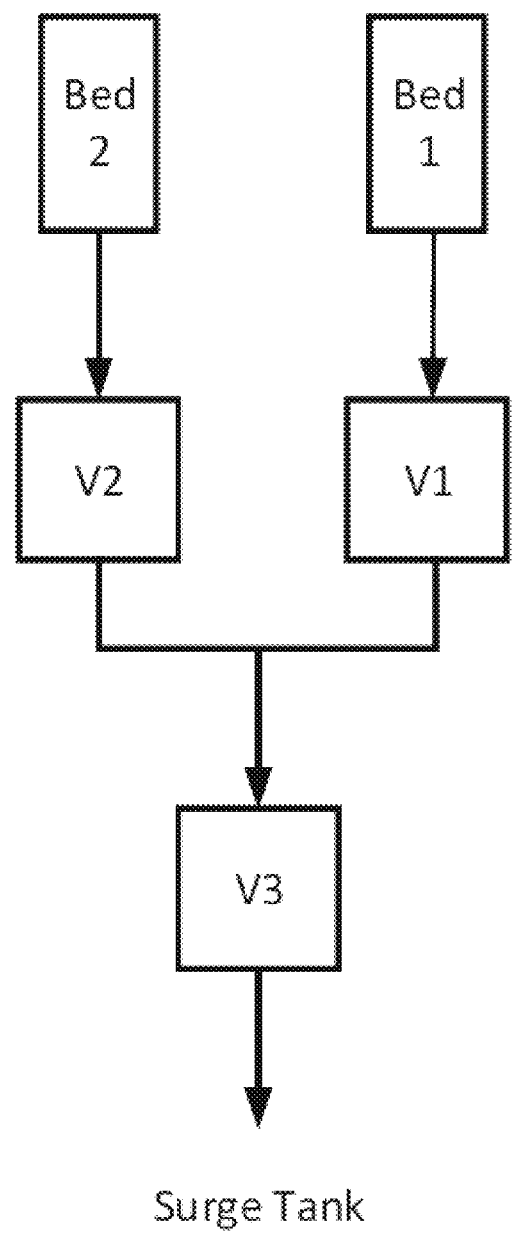
FIG. 6 is a simplified schematic depicting the flow of the blowdown and purge exhaust gas streams in a rotary bed PSA apparatus and process using the stator plate of FIG. 4B.

FIG. 6 provides a simplified depiction of the flow of the blowdown and purge exhaust gas streams in a rotary bed PSA apparatus and process using the "dual port" stator plate of FIG. 4B. The blowdown exhaust gas stream from Bed 1 (in blowdown mode) and purge gas exhaust stream from Bed 2 (in purge mode) are directed respectively to volumes V1 and V2 of exhaust slots 58*b* and 58*a*, respectively. The exhaust streams are discharged separately from each slot and are optionally subsequently join mixed in a downstream exhaust manifold V3 before being sent to an exhaust surge tank.

FIG. 4C shows a first stator plate 68 in accordance with another embodiment of the present invention, wherein the stator plate has an exhaust slot for receiving both the purge and blowdown exhaust gas streams but which slot is partially split by a flow restriction, which in the depicted embodiment takes the form of a barrier that does not extend the full height of the slot (such an arrangement also being referred to herein after as a "bridged dual slot" or "bridged dual port" stator plate).

The stator plate 68 comprises a physical barrier 70 in the exhaust slot 74 that separates the slot into a first section or "sub-slot" 74*a* and a section second or "sub-slot" 74*b*, having respectively volumes V2 and V1, for receiving respectively a purge gas exhaust stream and a blowdown exhaust gas stream. The location and size of the barrier 70 within the slot 74 may be varied in order to alter the volumes of the sub-slots 74*a* and 74*b*. The exhaust sub-slot 74*a* has an outlet 82 for discharging a purge exhaust gas stream therefrom, and the exhaust sub-slot 74*b* has a separate outlet 82 for discharging a blowdown exhaust gas stream therefrom. Optionally, outlets 82 may be connected to separate pipes terminating in separate exhaust ports, or they may be connected to a single large common exhaust manifold, sized to avoid backpressure in the exhaust slots.

The barrier 70 in the depicted embodiment extends across the full width of the slot 74 in a radial direction of the plate. The width of the barrier 70 in the circumferential direction of the plate may be adjusted to meet the specific requirements of the PSA apparatus, but preferably said width of the barrier is less than the diameter of the rotor ports of the beds (again to minimize any downtime between blowdown and purge steps as the rotor ports move over the barrier).

The barrier 70 comprises two internal side walls 71 that are in fluid communication with the interior cavity of each respective sub-slot either side of the barrier. The shape of the side walls may be adjusted to meet the requirements of the barrier. In the preferred embodiment shown in FIG. 4C the side walls 71 are of a concave shape in order to provide rounded end walls in each sub-slot, which minimizes the stress on the walls 71 caused by gas pressure in the slot 74 when in use, and thus minimizes the risk of mechanical failure of the barrier 70.

The depicted barrier 70 extends from a floor 76 of the slot 74 to a height that is below the full height of the slot and thus that is below the upper surface 78 of the stator plate 68; i.e. the barrier 70 extends from the floor 76 to a height part way up the internal walls 73 of the slot 74. The barrier 70 is thus configured to allow a restricted gas flow through slot 74 between the sub-slots 74*a* and 74*b* (i.e. it provides a gas bridge between the sub slots) that allows some mixing of gas between the slots but that restricts the mixing of gas as compared to what would occur in the slot absent the barrier.

Preferably, the barrier 70 extends from the floor 76 to a height that is at most 99%, 98%, 96%, 95% or 93% of the height of the internal walls 73, and that is at least 50%, 60%, 70%, 80%, 85%, 90%, 91% or 92% of the height of the internal walls, thereby resulting in an open cross-sectional area of the slot above the barrier that is at least 1%, 2%, 4%, 5% or 7% and is at most 50%, 40%, 30%, 20%, 15%, 10%, 9% or 8% of the maximum cross sectional area of the slot at any other location. Equally, in embodiments where a physical barrier or some other form or shape is used (as compared to the barrier depicted in FIG. 4C), it remains the case that the open cross-sectional area of the slot at the location of the physical barrier is preferably at least 1%, 2%, 4%, 5% or 7% and is at most 50%, 40%, 30%, 20%, 15%, 10%, 9% or 8% of the maximum cross sectional area of the slot at any other location.

In the depicted embodiment, the stator plate 68 also has a feed slot 72 that is partially split by a physical barrier 70 in the feed slot 72 that separates the slot into a first section or "sub-slot" 72*a* and a second section of "sub-slot" 72*b*, each of the two sub-slots 72*a* and 72*b* comprise a gas inlet 80 for receiving a feed gas. Again, partially splitting the feed slot in this way can have similar benefits to partially dividing the exhaust slot in terms of stiffening the stator plate, and may be particularly useful where PSA cycle has a long feed step that would otherwise require a correspondingly long feed slot and may be receiving relatively high pressure feed gas for delivery to several beds in feed mode. Equally, in a stator plate that uses a single feed slot for delivering feed gas to a bed in re-pressurization mode (e.g. undergoing step RP/F5 in FIG. 1) and to one or more beds in feed mode (e.g. undergoing step F1/F2/F3/F4 in FIG. 1), it may be helpful to have a sub-slot for delivering feed gas to a bed in re-pressurization mode and a separate sub-slot for delivering feed gas to the bed(s) in feed mode, so as to avoid or minimize backflow, via the feed slot, from a bed in feed mode to a bed in re-pressurization mode at the start of the re-pressurization step. The preferred characteristics (i.e. shape, dimensions, etc.) of the a physical barrier 70 in the feed slot 72 are as described above in relation to the physical barrier 70 in the exhaust slot 74.

Whilst the embodiment depicted in FIG. 4C has one feed slot 72 and one exhaust slot 74, in other embodiments the stator plate could have more feed slots and/or more exhaust slots. It would, of course, also be possible to have a stator plate that represents a mix of the two embodiments depicted in FIGS. 4B and 4C, wherein the stator plate has two exhaust slots as shown in FIG. 4B and one feed slot as shown in FIG. 4C, or vice-versa.

Figure 7:
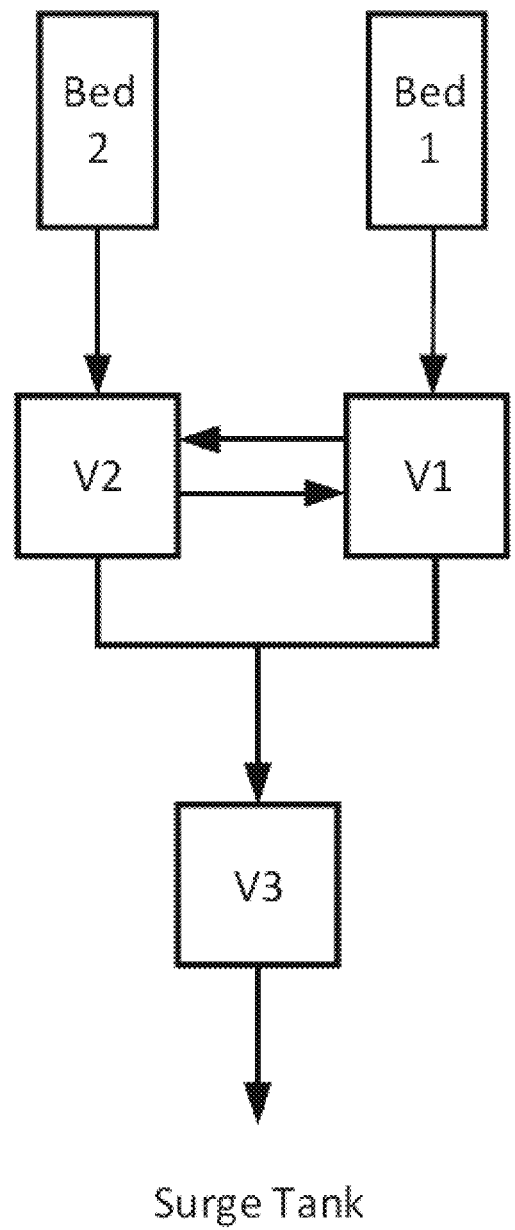
FIG. 7 is a simplified schematic depicting the flow of the blowdown and purge exhaust gas streams in a rotary bed PSA apparatus and process using the stator plate of FIG. 4C.

FIG. 7 is a simplified depiction of the flow of the blowdown and purge exhaust gas streams in a rotary bed PSA apparatus and process using the "bridged dual port" stator plate of FIG. 4C. The blowdown exhaust gas stream from Bed 1 (in blowdown mode) and purge gas exhaust stream from Bed 2 (in purge mode) are directed respectively to volumes V1 and V2 of exhaust sub-slots 74*b* and 74*a*, respectively. The exhaust streams are discharged separately from each slot and are optionally subsequently joined and mixed in a downstream exhaust manifold V3 before being sent to an exhaust surge tank.

With reference to the above discussion of the benefits of splitting or partially splitting the exhaust slot and/or feed slots in the first stator plate, it should also be noted that it can be beneficial to partially or fully split the product slot in the second stator plate, for similar reasons to those discussed above in relation to partially or fully splitting the exhaust and/or feed slots. In particular, partially splitting the product slot into two sections (two sub-slots), divided by a flow restriction, or fully splitting the product slot into two separate slots can help stiffen the stator plate, and may be particularly useful where PSA cycle has a long feed step that would otherwise require a correspondingly long product slot receiving high pressure product gas from several beds in feed mode. Equally, in comparison to a stator plate that uses a single product slot for both delivering product gas to a bed in re-pressurization mode (e.g. undergoing step RP/F5 in FIG. 1) and receiving product gas from one or more beds in feed mode (e.g. undergoing step F1/F2/F3/F4 in FIG. 1), it may be helpful to have a sub-slot or slot for delivering product gas to a bed in re-pressurization mode, and a separate sub-slot or slot for receiving product gas from the bed(s) in feed mode. The preferred characteristics (i.e. shape, dimensions, etc.) of a section of the stator plate separating the two product slots or of a barrier separating the two product sub-slots are as described above in relation to the section of the stator plate or barrier separating exhaust slots or sub-slots.

Likewise, it may also be beneficial to partially or fully split the purge slot in the second start plate in a similar manner to that described above. In particular, partially splitting the purge slot into two sections (two sub-slots), divided by a flow restriction, or fully splitting the product slot into two separate slots can help stiffen the stator plate, and may be particularly useful where PSA cycle has a long purge step that would otherwise require a correspondingly long purge slot.

Figure 8A:
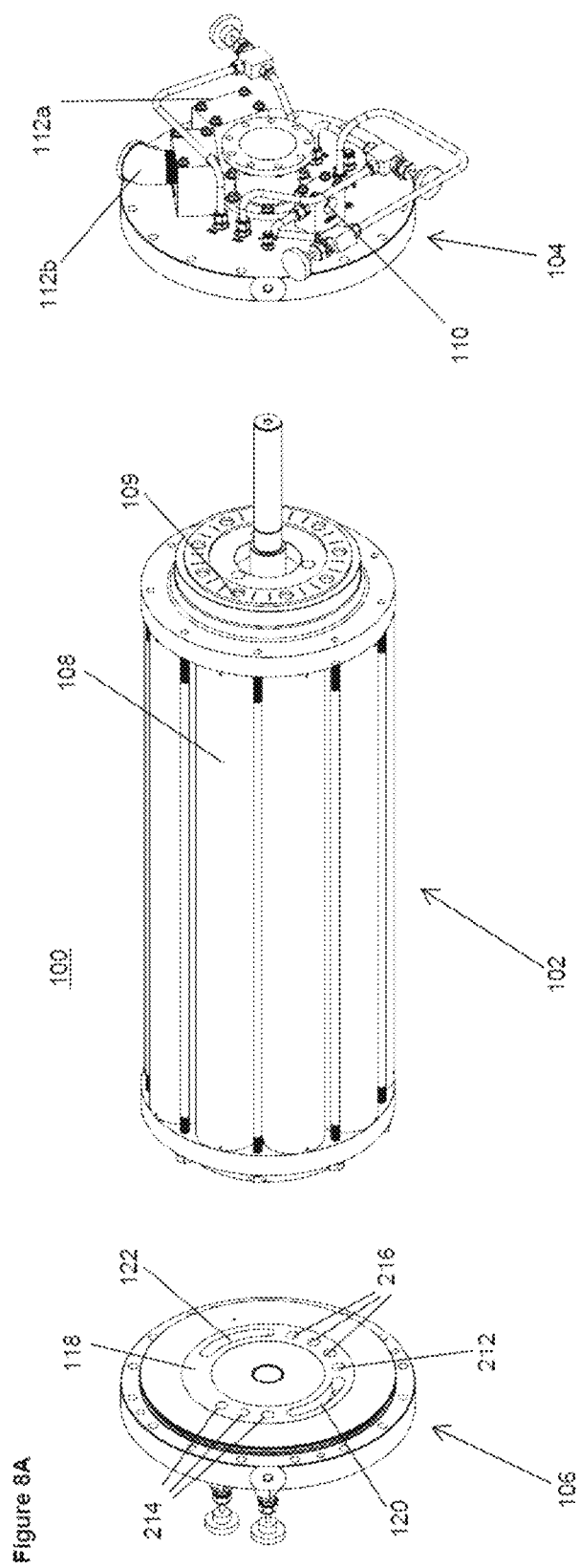
FIGS. 8A and 8B are exploded perspective views of a rotary bed PSA apparatus incorporating a stator plate similar to that depicted in FIG. 4B.
Figure 8B:
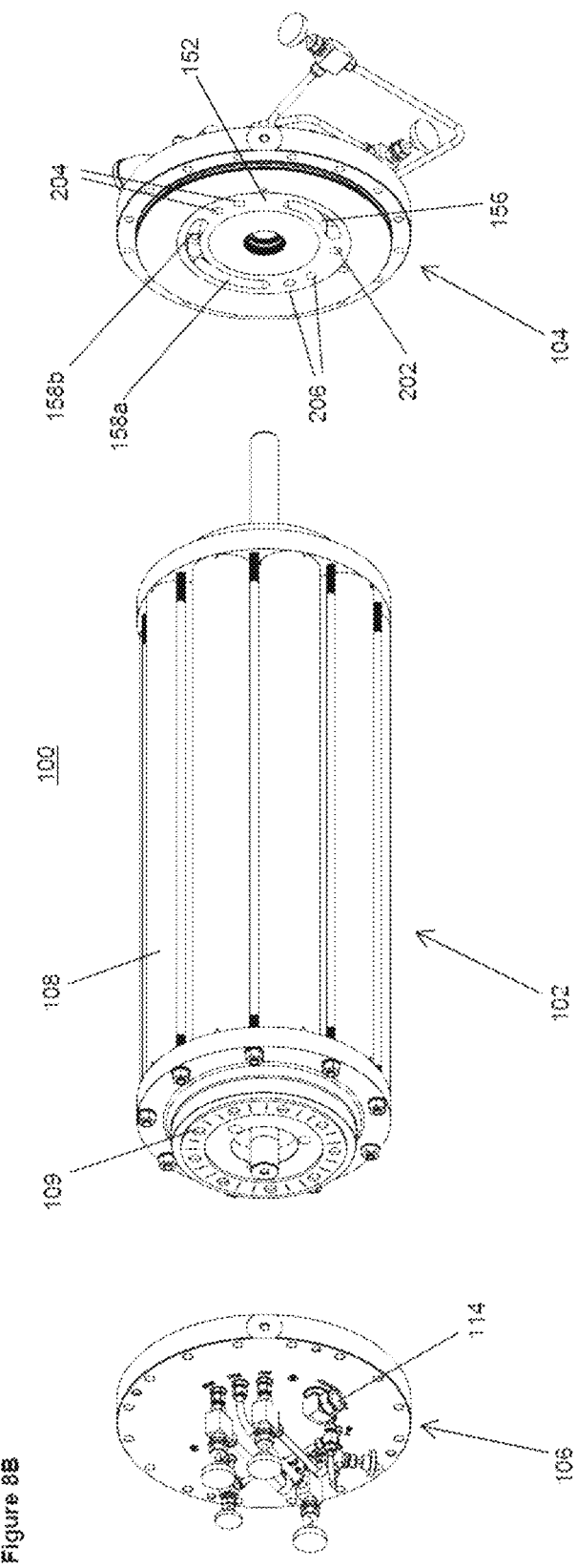

FIGS. 8A and 8B show a rotary bed PSA apparatus 100 incorporating a first stator plate 152 similar to that depicted in FIG. 4B. The rotary bed PSA apparatus 100 comprises a rotor assembly 102, a first stator assembly 104, and a second stator assembly 106, the rotor assembly 102 being positioned between and rotatably connected to the first and second stator assemblies 104 and 106 such that it can rotate relative to said stator assemblies. The rotor assembly 102 comprises a plurality of adsorption beds 108 having a rotor port 109 at each end of the bed via which gas enters or exits the bed. Each bed may comprise a single vessel (as shown) or plurality of vessels (sharing the same rotor ports) containing an adsorbent selective for one or more components of a feed gas that is to be passed through the beds. The apparatus may, for example, be suitable for carrying out a $N_2$ PSA cycle such as that depicted in FIG. 1, in which case the rotor assembly 102 will have nine adsorption beds 108, each containing an adsorbent selective for oxygen (i.e. an adsorbent that adsorbs preferentially to nitrogen). The adsorbent may have kinetic and/or equilibrium selectivity for the more preferentially adsorbed components, and may take any suitable form, such as for example taking the form of structured packing (such as for example where the adsorbent has a laminate structure) or random packing (such as for example where the adsorbent takes the form of beads or pellets loaded into the adsorption vessel) or indeed any combination of the two.

The first stator assembly 104 comprises at least one feed port 110, at least one exhaust port 112a and 112b and a first stator plate 152 having at least one feed slot 156 for directing at least one feed gas stream from the feed port 110 to the rotor ports 109 of any of the adsorption beds 108 aligned (and thus in fluid communication) with the feed slot 156, and two exhaust slots 158a and 158b for directing flow of exhaust gas streams to the exhaust port(s) 112 from the rotor ports 109 of any of the adsorption beds aligned with the exhaust slots 158a and 158b. Typically, the first stator plate 152 will also contain other slots for directing flows of other gas streams that are used in the PSA cycle. For example, in the depicted embodiment the first stator plate also has a second feed slot (also referred to herein as a feed re-pressurization slot) 202, two equalization depressurization slots 204, and two equalization re-pressurization slots 206.

As noted above, the first stator plate 152 in the embodiment depicted in FIG. 8 is a stator plate of the "dual port" type, similar to the first stator plate 52 depicted in FIG. 4B. In particular, as shown more clearly in FIG. 4B and described above, the first stator plate 152 has first and second exhaust slots 158a and 158b for separately receiving and handling respectively a purge gas exhaust stream and a blowdown exhaust gas stream. In this way, backpressure issues resulting from mixing of the two streams in a single slot are avoided.

In the particular embodiment shown, the first stator assembly 104 has two exhaust ports 112a and 112b (each located in or attached to a manifold block), one for each of the two outlets from each exhaust slot 158a and 158b. However, as will be understood, these could of course be replaced by a shared and suitably sized exhaust manifold connecting the two outlets to a single exhaust port.

The second stator assembly 106 comprises at least one product port 114 and a second stator plate 118 having at least one product slot 120 for directing flow of at least one product gas stream to the product port 114 from any of the rotor ports 109 of the adsorption beds aligned with the product slot 120, and at least one purge slot 122 (also referred to as a "provide purge" slot) for directing flow of at least one purge gas stream (such as for example a stream of product gas) to any the rotor ports 109 of any of the adsorption beds aligned with the purge slot 122. Typically, the second stator plate 118 will also contain other slots for directing flows of other gas streams that are used in the PSA cycle. For example, in the depicted embodiment the second stator plate also has a second product slot (also referred to as a product re-pressurization slot) 212, three equalization depressurization slots 214, and three equalization re-pressurization slots 216.

Rotation of rotor assembly 102 relative to the first and second stator assemblies 104 and 106 thereby operates to change the operating modes of individual adsorption beds 108 of the rotor assembly 102 by changing which rotor ports 109 are in alignment with which slots in the first and second stator plates 152 and 118.

More specifically, taking the specific example of the embodiment shown in FIG. 8, and taking as a starting point an individual bed 108 that is in feed mode undergoing the feed step of the PSA cycle, at this point in time the rotor port 109 at one end of the bed is aligned (i.e. is in fluid communication with) with the feed slot 156 in the first stator plate 152 and the rotor port 118 at the other end of the bed is aligned with the product slot 120 in the second stator plate 106, such that feed gas entering the feed port 110 is directed by the feed slot 156 into one end of the bed 108, flows (by definition in a co-current direction) through the bed 108 (which selectively adsorbs one or more components therefrom) and the exits the other end as a product gas that is directed by the product slot 120 to the product port 114.

As the rotor assembly 102 rotates the bed 108 is brought out of alignment with the feed 156 and product 120 slots and into alignment in turn with first one of the three equalization depressurization slots 214 in the second stator plate 118 and then the remainder of the equalization depressurization slots 214 in the second stator plate 118 and two equalization depressurization slots 204 in the first stator plate 152, thereby switching the bed into an equalization depressurization mode and carrying out three equalization depressurization steps (first a co-current step and then two dual steps) in which gas is exhausted from bed and directed by the equalization depressurization slots and associated piping to the equalization re-pressurization slots.

As the rotor assembly 102 continues to rotate, next the bed 108 is brought out of alignment with the an equalization depressurization slots and into alignment with the second exhaust slot 158b so as to switch the bed into blowdown mode and commence the blowdown step, in which gas is exhausted counter-currently from the bed generating a blowdown exhaust gas stream that is directed via said exhaust slot 158b to the exhaust port 112b. Next the bed 108 is brought into alignment with the purge slot 122 and the first exhaust slot 158a so as to switch the bed into purge mode and commence the purge step, in which purge gas is directed into one end of the bed by the purge slot 122 and flows counter-current through the bed desorbing adsorbed components and generating a purge exhaust gas stream that is directed by said first exhaust slot 158a to the exhaust port 112a.

Next the bed 108 is brought into alignment in turn with the two equalization re-pressurization slots 206 in the first stator plate 152 and three equalization re-pressurization slots 216 in the second stator plate 118, thereby switching the bed 108 into an equalization re-pressurization mode and carrying out three equalization re-pressurization steps (first two dual steps and then a counter-current step) in which the bed 108 is re-pressurized with gas from other beds undergoing equalization depressurization steps, said gas being directed into the bed 108 by the equalization re-pressurization slots.

Next the bed 108 is brought into alignment with the feed and product re-pressurization slots 202 and 212, thereby switching the bed into a feed and product re-pressurization mode and carrying out a feed and product re-pressurization step, in which the bed is further re-pressurized with feed and product gas.

Finally, the bed 108 is brought back into alignment with the feed slot 156 and product slot 120, switching the bed back into feed mode and recommencing the PSA cycle in said bed.

As will be understood, the rotary bed PSA apparatus 100 depicted in FIG. 8 could equally employ a first stator plate of the "bridged dual port" type, such as one the same as or similar to that depicted in FIG. 4C, instead of a first stator plate of the "dual port" type as depicted in FIG. 8. Likewise, stator plates with more or less or a different arrangement of equalization and re-pressurization slots could be used.

EXAMPLES

Example 1. Effects of Back Flow on Process Performance Indicators

A simulation of the 9-bed multi-step PSA process shown in FIG. 1 employing a standard rotary bed technology was used to quantify the effect of back flow on the process performance indicators. An in-house process simulator, SIMPAC, was used to model the process in the case of nitrogen separation from air using a carbon molecular sieve (CMS) adsorbent. The PSA bed length and internal diameter considered for the evaluation are 40 in and 4 in, respectively.

In the absence of back flow, the productivity and feed to product ratio (inverse of recovery) are 260.42 scfh60 F./ft$^3$ and 2.32, respectively, at 100° F. and 100 psig pressure for $N_2$ product purity of 99.5% (see Table 1). The performances degrades significantly (reduction in productivity and increase in feed to product ratio) when backflow is introduced successively either in a single step or in multiple steps (shown in Table 1). The counter-current blow-down (CnD1 and CnD3) and purge (PU2 and PU4) steps occurred at the same time in this 9-bed multi-step PSA process (highlighted in gray in the cycle schedule in FIG. 1). The higher flow and pressure during CnD1 was in particular attributed to causing this flow reversal. The inefficiency of regeneration (due to the exposure of enriched contaminant, $O_2$) was identified as being the root cause of performance degradation during the back flow.

TABLE 1

Effect of back flow on the process performance indicators.

| Back Flow Status | Temperature ° F. | Pressure (psig) | Product $N_2$ (%) | Feed to Product Ratio | Productivity (scfh60 F./ft$^3$) |
|---|---|---|---|---|---|
| None | 100 | 100 | 99.5 | 2.32 | 260.42 |
| PU4 | 100 | 100 | 99.5 | 2.41 | 211.67 |
| CnD3 + PU4 | 100 | 100 | 99.5 | 2.73 | 164.09 |
| CnD3 + PU2 + PU4 | 100 | 100 | 99.5 | 3.40 | 110.52 |

Figure 9:
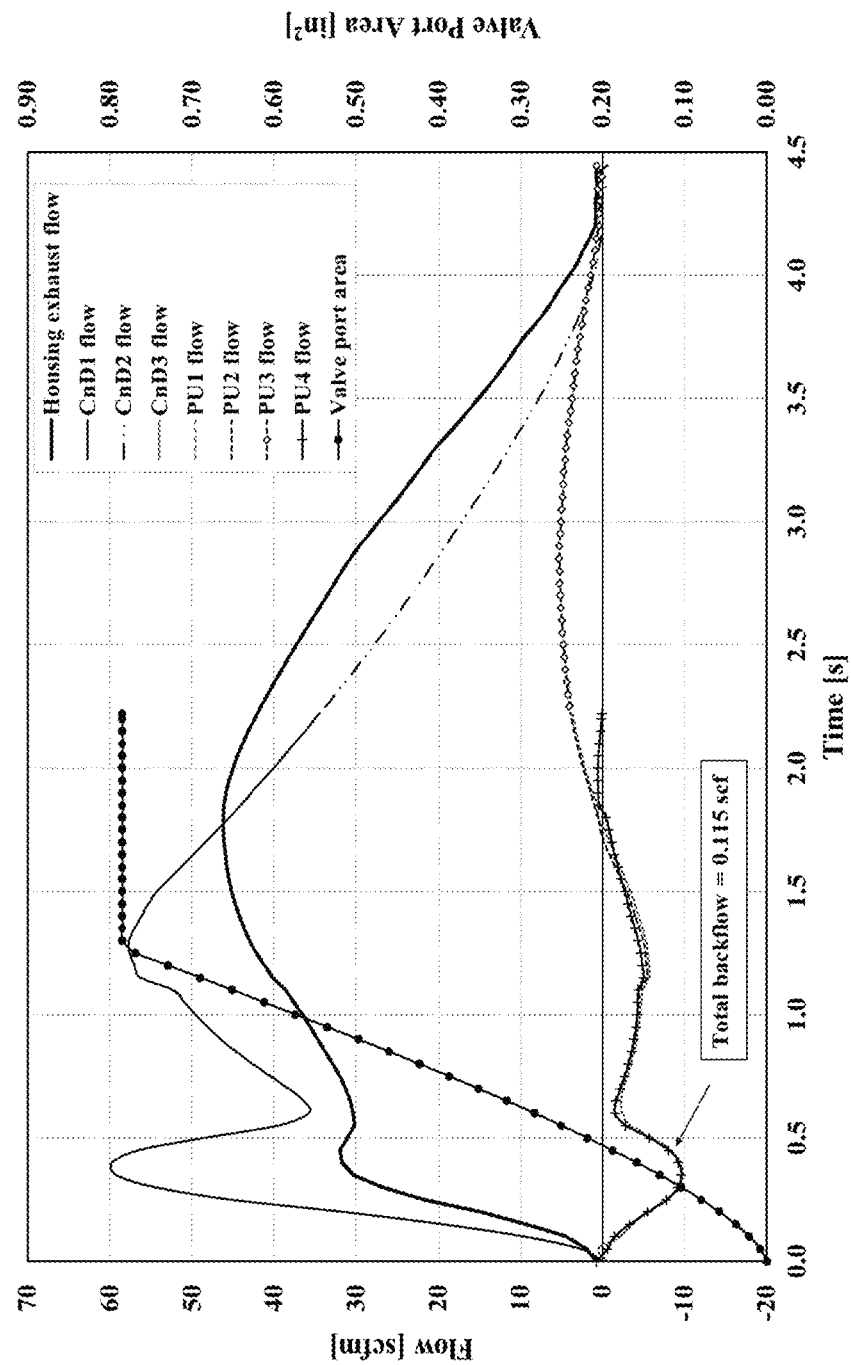
FIG. 9 is a graph depicting flow rate versus time for various beds undergoing steps of a $N_2$ PSA process utilizing a PSA cycle as depicted in FIG. 1.
Figure 10:
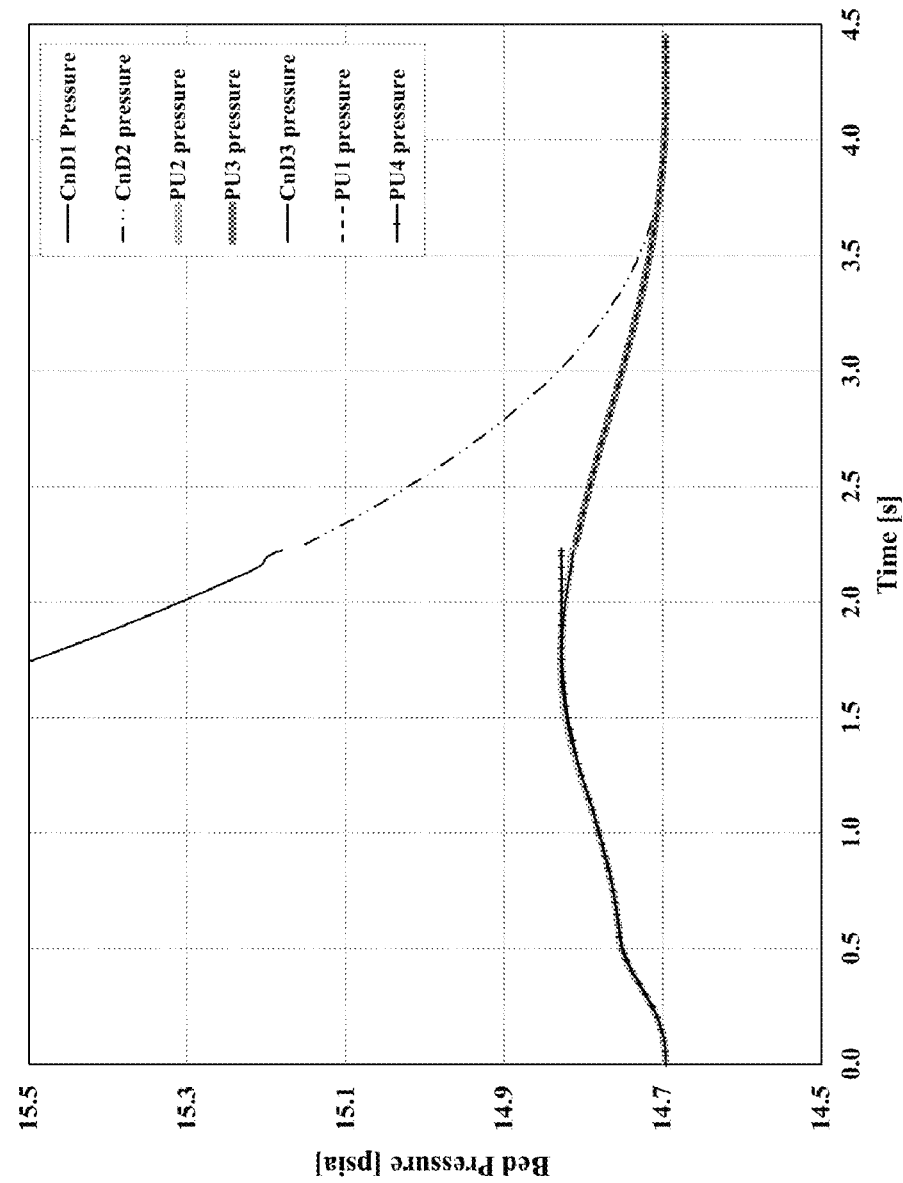
FIG. 10 is a graph depicting bed pressure versus time for various beds undergoing steps of a $N_2$ PSA process utilizing a PSA cycle as depicted in FIG. 1.

FIG. 9 shows the flows (from valve exhaust as well as from blowdown and purge steps) and valve port area as a function of time for the 9-bed multi-step PSA process of FIG. 1 when using a stator plate with a single exhaust slot and outlet, and containing no flow barriers, for handling the blowdown and purge streams (i.e. where the blowdown and purge streams are not separated in any way). The bed pressure history (at the middle of the bed) for the blowdown and purge steps in such a scenario is presented in FIG. 10. As can be seen, as the first stage of the blowdown step (CnD1) is at high flow and pressure, and the volume of exhaust slot collecting this flow is limited, a severe flow reversal can occur during the end of the blowdown step (CnD3) and in the purge step (PU2 and PU4). It should be noted that CnD3, PU2 and PU4 are at the lowest pressure in the PSA cycle. PU4 is the end of the purge step, therefore if the adsorbent in the bed during this phase is exposed to enriched contaminant from the reverse flow stream the performance decreases significantly. As such, avoiding back flow would result in an increase in performance of the rotary PSA apparatus. It is common knowledge that higher purge pressure in a PSA is detrimental to the PSA gas separation efficiency, hence increasing the purge pressure to mitigate the backflow issue is not a viable option.

Example 2. Effect of Dual Port on Bed Purge Backpressure and Step Flows

FIGS. 4 to 7 illustrate various stator plate configurations, and are described in greater detail above. In brief, FIG. 4A is the "single port" configuration representing prior art. The exhaust effluent from two beds, Bed 1 and Bed 2, is vented to a single exhaust slot having a single volume V1. The gas then enters the exhaust manifold V3 and finally an exhaust surge tank (FIG. 5). FIG. 4B shows the "dual port" configuration with two separate exhaust slots 58b and 58a having two separate volumes V2 and V1, respectively. The exhaust gas streams from each slot join together in the exhaust manifold before being sent to the exhaust surge tank (FIG. 6). FIG. 4C illustrates the "bridged dual port" configuration, having a one exhaust slot that is partially divided into two sub-slots. Sub-slot 74b (V1) and sub-slot 74a (V2) receive exhaust gas from Bed 1 and Bed 2, respectively. The majority of the blow down exhaust gas from one or more beds undergoing the blowdown step (and, in this particular example, also an exhaust stream from one or more beds undergoing a bed to bed purge step) is received and vented via sub-slot 74*a* (V2) but a small portion can flow to subs-slot 74*b* (V1) through the gas bridge between the two. Similarly, whilst the majority of the product purge exhaust gas from one or more beds undergoing a purge step (specifically a product purge step) is vented through sub-slot 74*a* (V2), a small portion can flow across the barrier to sub-slot 74*b* (V1) (FIG. 7).

The above three configurations were simulated in Aspen Adsorption to study their impact on bed backpressure and exhaust flows. The simulated $H_2$ PSA bed is 29 inches high. The results are summarized in Table 2.

TABLE 2

Effect of dual port on bed purge backpressure and step flows

| | | Feed End Bed Average Pressure (psig) | | | Step Flows (VVC) | |
|---|---|---|---|---|---|---|
| Exhaust Steps | Step Time (sec) | Single Port | Dual Port | Dual Port Bridged | No Bridge | With Bridge |
| Slot 1 Evacuation | 0.3 | | | | 1.058 | 0.878 |
| Bed to Bed Purge | 0.3 | | | | 0.754 | 0.603 |
| Total | 0.6 | | | | 1.812 | 1.481 |
| Slot 2 Product Purge | 0.6 | 3.6 | 3.3 | 3.1 | 0.543 | 0.873 |

The "single port" configuration (FIG. 4A) creates higher back pressure to the PSA beds at the product purge step when compared to the other two configurations (FIGS. 4B and 4C). The "bridged dual port" configuration (FIG. 4C) has the lowest product purge pressure.

Figure 11:
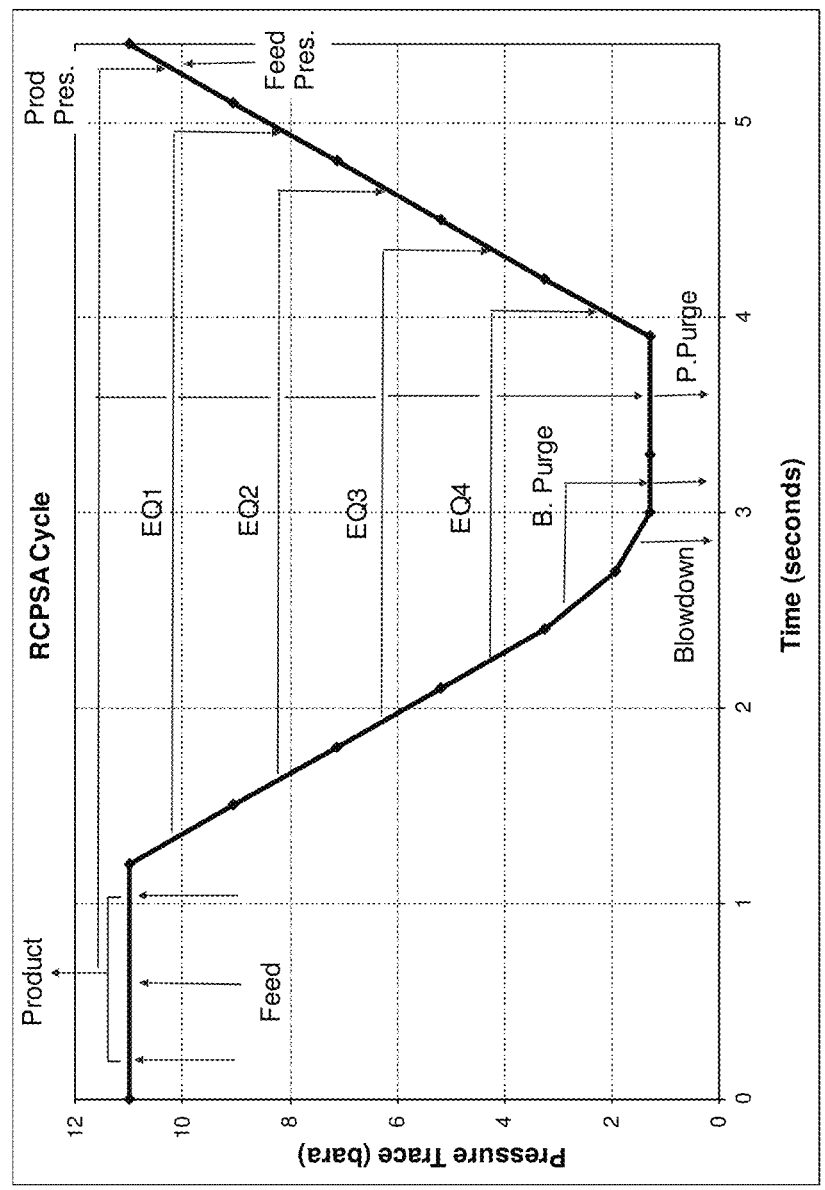
FIG. 11 is a graph depicting changes in bed pressure during the steps of an multi-bed multi-step $H_2$ PSA cycle.

The exhaust flows from various exhausting steps were also investigated by simulation. In a typical $H_2$ PSA cycle as shown in FIG. 11, blowdown exhaust flows are at a much higher pressure than the product purge flow. The VVC refers to standard volume of exhaust gas generated in one cycle as a ratio of bed volume. For the "dual port" configuration in FIG. 6, a large amount of blowdown (and bed-bed purge) exhaust gases from one bed (bed 1) will flow through sub-slot 58*b* alone and enter the exhaust manifold (V3), which in certain instances may cause the exhaust manifold (V3) to be pressurized. Since the exhaust manifold (V3) is the common holder for all the exhaust gases, such a pressure rise may result in a moderate increase in the pressure of the product purge slot 58*a*, reducing the overall effectiveness of product purge. The "bridged dual port" configuration shown in FIG. 7, however, allows a portion of the blowdown (and bed-bed purge) exhaust gas to go to sub-slot 74*a*, reducing pressure spikes in the exhaust manifold V3. The step flows in Table 2 show that the "bridged dual port" configuration helps reduce the flow difference among all steps.

Figure 12:
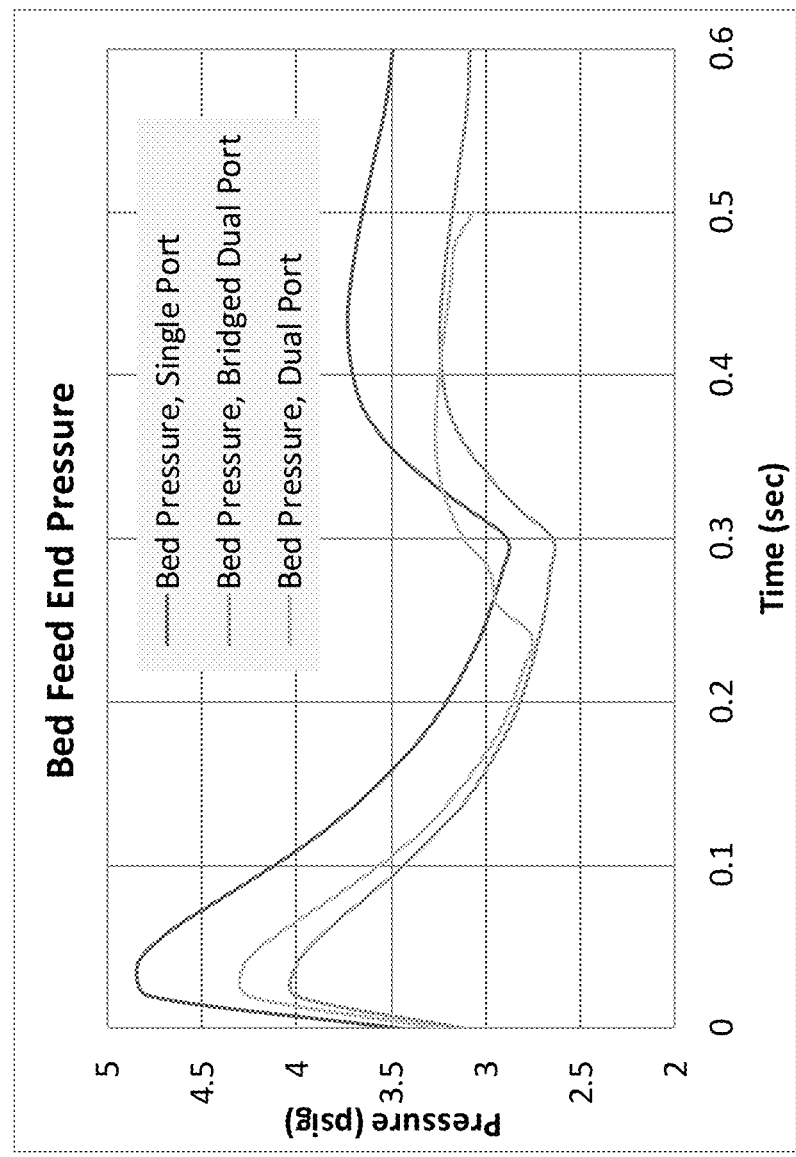
FIG. 12 is a graph depicting bed pressure versus time when using the different stator plates of FIG. 4.

FIG. 12 further compares simulated pressure variations of the feed end of PSA beds on exhaust steps by Aspen Adsorption program. The pressure variation pattern is repeatable with a periodic time of ~0.6 seconds. All three configurations show similar shape. The "dual port" configuration curve has a slightly shorter step time due to a small dead step caused by the full segregation the two sub-slots. FIG. 12 shows that both the "dual port" and "bridged dual port" configurations help reduce the pressure variation, especially in the second half of the step.

Example 3. Deformation of the Sealing Surface of the Stator Plate and Non-Flatness Finite element analysis (FEA) was performed on a stator plate model for three cases, "single port" (FIG. 4A), "dual ports" (FIG. 4B), and "bridged dual ports" (FIG. 4C) (in this model the barrier height was 0.1 inch lower than the height of the internal walls of the stator slot, i.e. ~93% of the height of the internal wall of the stator slot). Same mechanical and process conditions were applied in all three cases. The stator plate thickness was 3.2 inch and the full slot height/depth was 1.4 inch.

The deformation at eight points on each model at the same location of the sealing surface is shown in Table 3. The FEA results show that for both "dual port" configurations (FIGS. 4B and 4C), the sealing surface deformation is reduced substantially. The last row of the table shows the overall flatness deviation which is the deformation between the maximum and minimum points on the sealing surface. It shows a reduction of non-flatness of 41% for the full barrier scenario (i.e. two fully separated slots as in FIG. 4B) and of 37% for the partial barrier scenario (i.e. one slot separated by a barrier into two sections as in FIG. 4C), when compared with the no barrier case (FIG. 4A).

The barrier height can be varied based on the process and mechanical requirement. However, a lower barrier will have less effect on deformation. A tradeoff can be made to optimize the barrier height so that maximum PSA separation efficiency is achieved.

TABLE 3

Deformation of the Sealing Surface of the Stator Plate and Non-Flatness.

| | Deformation, Thousandth of an Inch | | |
|---|---|---|---|
| Points | No Barrier | Barrier Below Sealing Surface 0.1" | Full Barrier |
| 1 | 0.2828 | 0.1847 | 0.1933 highest point |
| 2 | 0.2368 | 0.1570 | 0.1498 |
| 3 | 0.3832 highest point | 0.2015 highest point | 0.1062 |
| 4 | 0.3154 | 0.1824 | 0.0780 |
| 5 | 0.0853 lowest point | 0.0379 | 0.0385 |
| 6 | 0.1051 | 0.0419 | 0.0421 |
| 7 | 0.2036 | 0.0139 lowest point | 0.0185 lowest point |
| 8 | 0.2472 | 0.0184 | 0.0199 |
| Overall Flatness Deviation (Maximum Minus Minimum) | 0.2979 | 0.1876 | 0.1748 |

While the principles of the invention have been described above in connection with preferred embodiments, it is to be clearly understood that this description is made only by way of example and not as a limitation of the scope of the invention.

The invention claimed is:

1. A rotary bed pressure swing adsorption (PSA) apparatus comprising a rotor assembly and first and second stator assemblies, wherein:

the rotor assembly is positioned between the first and second stator assemblies and comprises a plurality of adsorption beds each bed having a rotor port at either end of the bed via which gas enters or exits said bed, the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s), and the second stator assembly comprises at least one product port and a second stator plate having at least one product slot for directing flow of at least one product gas stream between the product port(s) and any of the rotor ports that are in alignment with the slot and at least one purge slot for directing flow of at least one purge gas stream into any of the rotor ports that are in alignment with the slot, the rotor assembly being rotatable relative to the first and second stator assemblies so as to change the operating modes of individual adsorption beds by changing which rotor ports are in alignment with which slots in the first and second stator plates, wherein when the rotor ports of a bed are in alignment with a feed slot and/or a product slot that bed is in re-pressurization mode or feed mode, when the rotor ports of a bed are in alignment with an exhaust slot and a purge slot that bed is in purge mode, and when the rotor ports of a bed are in alignment with an exhaust slot and are not in alignment with a purge slot that bed is in blowdown mode, and wherein either:

a) the at least one exhaust slot in the first stator plate comprises an exhaust slot that has a first section that is configured to receive a purge exhaust gas stream from at least one adsorption bed in purge mode and a second section that is configured to receive simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections being separated by a flow restriction that is configured to restrict but not fully prevent gas flow between the sections; or b) the at least one exhaust slot in the first stator plate comprises a first exhaust slot that is configured to receive a purge exhaust gas stream from at least one adsorption bed in purge mode, and a separate second exhaust slot that is configured to receive simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

2. The rotary bed PSA apparatus of claim 1, wherein the at least one exhaust slot in the first stator plate comprises an exhaust slot that has a first section that is configured to receive a purge exhaust gas stream from at least one adsorption bed in purge mode and a second section that is configured to receive simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections being separated by a flow restriction that is configured to restrict but not fully prevent gas flow between the sections.

3. The rotary bed PSA apparatus of claim 2, wherein said flow restriction separating the first and second sections of the exhaust slot comprises at least one physical barrier disposed within the slot that reduces the open cross sectional area of the slot at the location of the physical barrier through which gas can flow.

4. The rotary bed PSA apparatus of claim 3, wherein said at least one physical barrier comprises a barrier disposed within the slot that extends across the full width of the slot and from the floor of the slot to a height that is less than the full height of the slot.

5. The rotary bed PSA apparatus of claim 3, wherein the open cross sectional area of the slot at the location of the physical barrier is from 1% to 50% of the maximum cross sectional area of the slot at any other location.

6. The rotary bed PSA apparatus of claim 3, wherein the open cross sectional area of the slot at the location of the physical barrier is from 1% to 20% of the maximum cross sectional area of the slot at any other location.

7. The rotary bed PSA apparatus of claim 3, wherein the width of the physical barrier, in the circumferential direction of the plate, is at its narrowest point less than the diameter of the rotor ports.

8. The rotary bed PSA apparatus of claim 1, wherein the at least one exhaust slot in the first stator plate comprises a first exhaust slot that is configured to receive a purge exhaust gas stream from at least one adsorption bed in purge mode, and a separate second exhaust slot that is configured to receive simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

9. The rotary bed PSA apparatus of claim 8, wherein the first exhaust slot is configured to receive a plurality of purge exhaust gas streams from a plurality of adsorption beds in purge mode, and/or the second exhaust slot is configured to receive a plurality of blowdown exhaust gas streams from a plurality of other adsorption beds in blowdown mode.

10. The rotary bed PSA apparatus of claim 8, wherein the section of the stator plate separating the first and second exhaust slots has a width, in the circumferential direction of the plate, that at its narrowest point is less than the diameter of the rotor ports.

11. The rotary bed PSA apparatus of claim 1, wherein said two separate outlets from said first and second sections of the exhaust slot or from said first and second exhaust slots are in fluid communication with the same exhaust port of the first stator assembly, said separate outlets being connected to the exhaust port via an exhaust manifold that receives both exhaust gas streams from both outlets, wherein the cross-sectional area of the exhaust manifold is greater than the cross section area of the exhaust slot or slots.

12. The rotary bed PSA apparatus of claim 1, wherein either:

a) the at least one feed slot in the first stator plate comprises a feed slot that has a first section that is configured to direct a first feed gas stream to at least one adsorption bed in re-pressurization or feed mode and a second section that is configured to direct a second feed gas stream to at least one other adsorption bed in feed mode, said first section having an inlet for receiving the first feed gas stream and said second section having a separate inlet for separately receiving the second feed gas stream, the first and second sections being separated by flow restriction that is configured to restrict but not fully prevent gas flow between the sections; or b) the at least one feed slot in the first stator plate comprises a first feed slot that is configured to direct a first feed gas stream to at least one adsorption bed in re-pressurization or feed mode, and a separate second feed slot that is configured to direct a second feed gas stream to at least one other adsorption bed in feed mode, the first feed slot having an inlet for receiving the first feed gas stream and the second feed slot having a separate inlet for separately receiving the second feed gas stream.

13. The rotary bed PSA apparatus of claim 1, wherein either:

a) the at least one product slot in the second stator plate comprises a product slot that has a first section that is configured to direct a first product gas stream to at least one adsorption bed in re-pressurization mode or receive a first product gas stream from at least one adsorption bed in feed mode and a second section that is configured to receive a second product gas stream from at least one other adsorption bed in feed mode, said first section having an inlet for receiving or outlet for discharging the first product gas stream and said second section having a separate outlet for separately discharging the second product gas stream, the first and second sections being separated by flow restriction that is configured to restrict but not fully prevent gas flow between the sections; or b) the at least one product slot in the first stator plate comprises a first product feed slot that is configured to direct a first product gas stream to at least one adsorption bed in re-pressurization mode or receive a first product gas stream from at least one adsorption bed in feed mode, and a separate second product slot that is configured to receive a second product gas stream from at least one other adsorption bed in feed mode, the first product slot having an inlet for receiving or outlet for discharging the first product gas stream and the second product slot having a separate outlet for separately discharging the second product gas stream.

14. A stator plate for a rotary bed pressure swing adsorption (PSA) apparatus, wherein the stator plate has at least one feed slot configured to be capable of directing at least one feed gas stream to at least one adsorption bed of the rotary bed PSA apparatus that is in re-pressurization or feed mode, and wherein either:

a) the stator plate further has an exhaust slot that has a first section that is configured to be capable of receiving a purge exhaust gas stream from at least one adsorption bed of the rotary bed PSA apparatus that is in purge mode and a second section that is configured to be capable of receiving simultaneously a blowdown exhaust gas stream from at least one other adsorption bed of the rotary bed PSA apparatus that is in blowdown mode, said first section having an outlet for discharging the purge exhaust gas stream from the stator plate and said second section having a separate outlet for separately discharging the blowdown exhaust gas stream from the stator plate, the first and second sections of the slot being separated by a flow restriction that is configured to restrict but not fully prevent gas flow between the sections; or b) the stator plate further has a first exhaust slot that is configured to be capable of receiving a purge exhaust gas stream from at least one adsorption bed of the rotary bed PSA apparatus that is in purge mode, and has a separate second exhaust slot that is configured to be capable of receiving simultaneously a blowdown exhaust gas stream from at least one other adsorption bed of the rotary bed PSA apparatus that is in blowdown mode, the first exhaust slot having an outlet for discharging the purge exhaust gas stream from the stator plate and the second exhaust slot having a separate outlet for separately discharging the blowdown exhaust gas stream from the stator plate.

15. A rotary bed pressure swing adsorption (PSA) process comprising subjecting each of a plurality of adsorption beds to a PSA cycle comprising a feed step during which the adsorption bed is in feed mode, a blowdown step during which the adsorption bed is in blowdown mode, a purge step during which the adsorption bed is in purge mode, an a re-pressurization step during which the adsorption bed is in re-pressurization mode, wherein:

the adsorption beds are located in a rotor assembly that is positioned between the first and second stator assemblies, each bed having a rotor port at either end of the bed via which gas enters or exits said bed, the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s), the second stator assembly comprises at least one product port and a second stator plate having at least one product slot for directing flow of at least one product gas stream between the product port(s) and any of the rotor ports that are in alignment with the slot at least one purge slot for directing flow of at least one purge gas stream into any of the rotor ports that are in alignment with the slot, the rotor assembly being rotated relative to the first and second stator assemblies so as to change the operating modes of individual adsorption beds by changing which rotor ports are in alignment with which slots in the first and second stator plates, wherein when the rotor ports of a bed are in alignment with a feed slot and/or a product slot that bed is in re-pressurization or feed mode, when the rotor ports of a bed are in alignment with an exhaust slot and a purge slot that bed is in purge mode, and when the rotor ports of a bed are in alignment with an exhaust slot and are not in alignment with a purge slot that bed is in blowdown mode, and wherein either:

a) the at least one exhaust slot in the first stator plate comprises an exhaust slot that has a first section that receives a purge exhaust gas stream from at least one adsorption bed in purge mode and a second section that receives simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections of the slot being separated by a flow restriction that restricts but does not fully prevent gas flow between the sections; or b) the at least one exhaust slot in the first stator plate comprises a first exhaust slot that receives a purge exhaust gas stream from at least one adsorption bed in purge mode, and a separate second exhaust slot that receives simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

16. The rotary bed PSA process of claim 15, wherein the at least one exhaust slot in the first stator plate comprises an exhaust slot that has a first section that receives a purge exhaust gas stream from at least one adsorption bed in purge mode and a second section that receives simultaneously a blowdown exhaust gas stream from at least one other adsorption bed in blowdown mode, said first section having an outlet for discharging the purge exhaust gas stream from the stator plate and said second section having a separate outlet for separately discharging the blowdown exhaust gas stream from the stator plate, the first and second sections of the slot being separated by a flow restriction that restricts but does not fully prevent gas flow between the sections.

17. The rotary bed PSA process of claim 16, wherein said flow restriction separating the first and second sections of the exhaust slot comprises at least one physical barrier disposed within the slot that reduces the open cross sectional area of the slot at the location of the physical barrier through which gas can flow.

18. The rotary bed PSA process of claim 17, wherein said at least one physical barrier comprises a barrier disposed within the slot that extends across the full width of the slot and from the floor of the slot to a height that is less than the full height of the slot.

19. The rotary bed PSA process of claim 17, wherein the open cross sectional area of the slot at the location of the physical barrier is from 1% to 50% of the maximum cross sectional area of the slot at any other location.

20. The rotary bed PSA process of claim 17, wherein the open cross sectional area of the slot at the location of the physical barrier is from 1% to 20% of the maximum cross sectional area of the slot at any other location.

21. The rotary bed PSA process of claim 17, wherein the width of the physical barrier, in the circumferential direction of the plate, is at its narrowest point less than the diameter of the rotor ports.

22. The rotary bed PSA process of claim 15, wherein the at least one exhaust slot in the first stator plate comprises a first exhaust slot that receives a purge exhaust gas stream from at least one adsorption bed in purge mode, and a separate second exhaust slot that receives simultaneously a blowdown exhaust gas stream from at least one other adsorption bed in blowdown mode, the first exhaust slot having an outlet for discharging the purge exhaust gas stream from the stator plate and the second exhaust slot having a separate outlet for separately discharging the blowdown exhaust gas stream from the stator plate.

23. The rotary bed PSA process of claim 22, wherein the first exhaust slot receives a plurality of purge exhaust gas streams from a plurality of adsorption beds in purge mode, and/or the second exhaust slot receives a plurality of blowdown exhaust gas streams from a plurality of other adsorption beds in blowdown mode.

24. The rotary bed PSA process of claim 22, wherein the section of the stator plate separating the first and second exhaust slots has a width, in the circumferential direction of the plate, that at its narrowest point is less than the diameter of the rotor ports.

25. The rotary bed PSA process of claim 15, wherein said two separate outlets from said exhaust slot or said first and second exhaust slots direct the exhaust gas streams to the same exhaust port of the first stator assembly, said separate outlets being connected to the exhaust port via an exhaust manifold that receives both exhaust gas streams from both outlets, wherein the cross-sectional area of the exhaust manifold is greater than the cross section area of the exhaust slot or slots.

26. The rotary bed PSA process of claim 15, wherein either:

a) the at least one feed slot in the first stator plate comprises a feed slot that has a first section that directs a first feed gas stream to at least one adsorption bed in re-pressurization or feed mode and a second section that directs a second feed gas stream to at least one other adsorption bed in feed mode, said first section having an inlet for receiving the first feed gas stream and said second section having a separate inlet for separately receiving the second feed gas stream, the first and second sections being separated by flow restriction that restricts but not fully prevent gas flow between the sections; or b) the at least one feed slot in the first stator plate comprises a first feed slot that directs a first feed gas stream to at least one adsorption bed in re-pressurization or feed mode, and a separate second feed slot that directs a second feed gas stream to at least one other adsorption bed in feed mode, the first feed slot having an inlet for receiving the first feed gas stream and the second feed slot having a separate inlet for separately receiving the second feed gas stream.

27. The rotary bed PSA process of claim 15, wherein either:

a) the at least one product slot in the second stator plate comprises a product slot that has a first section that directs a first product gas stream to at least one adsorption bed in re-pressurization mode or receives a first product gas stream from at least one adsorption bed in feed mode and a second section that receives a second product gas stream from at least one other adsorption bed in feed mode, said first section having an inlet for receiving or outlet for discharging the first product gas stream and said second section having a separate outlet for separately discharging the second product gas stream, the first and second sections being separated by flow restriction that restricts but not fully prevent gas flow between the sections; or b) the at least one product slot in the first stator plate comprises a first product slot that directs a first product gas stream to at least one adsorption bed in re-pressurization mode or receives a first product gas stream from at least one adsorption bed in feed mode, and a separate second product slot that receives a second product gas stream from at least one other adsorption bed in feed mode, the first product slot having an inlet for receiving or outlet for discharging the first product gas stream and the second product slot having a separate outlet for separately discharging the second product gas stream.

* * * * *